United States Patent
Kim et al.

(10) Patent No.: US 12,489,977 B2
(45) Date of Patent: Dec. 2, 2025

(54) CAMERA MODULE

(71) Applicant: LG INNOTEK CO., LTD., Seoul (KR)

(72) Inventors: Kyung Won Kim, Seoul (KR); Kyung Sung Chu, Seoul (KR); Bon Seok Ku, Seoul (KR); Chan Joong Kim, Seoul (KR); Hyun Gyu Roh, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 615 days.

(21) Appl. No.: 17/641,263

(22) PCT Filed: Sep. 16, 2020

(86) PCT No.: PCT/KR2020/012515
§ 371 (c)(1),
(2) Date: Mar. 8, 2022

(87) PCT Pub. No.: WO2021/054725
PCT Pub. Date: Mar. 25, 2021

(65) Prior Publication Data
US 2022/0329734 A1    Oct. 13, 2022

(30) Foreign Application Priority Data

Sep. 16, 2019 (KR) .......................... 10-2019-0113631
Sep. 25, 2019 (KR) .......................... 10-2019-0118193

(51) Int. Cl.
*H04N 23/69* (2023.01)
*G02B 7/02* (2021.01)
(Continued)

(52) U.S. Cl.
CPC ............ *H04N 23/69* (2023.01); *G02B 7/021* (2013.01); *G03B 5/02* (2013.01); *G03B 13/36* (2013.01);
(Continued)

(58) Field of Classification Search
CPC . G02B 7/021; G03B 3/10; G03B 5/00; G03B 5/02; G03B 13/36;
(Continued)

(56) References Cited

U.S. PATENT DOCUMENTS

| 5,225,941 A | 7/1993 | Saito et al. |
| 2007/0217775 A1* | 9/2007 | Shirono ................. H04N 23/55 348/E5.025 |

(Continued)

FOREIGN PATENT DOCUMENTS

| CN | 1797053 | 7/2006 |
| CN | 101675369 | 3/2010 |

(Continued)

OTHER PUBLICATIONS

Japanese Office Action dated Jul. 2, 2024 issued in Application No. 2022-516653.

(Continued)

*Primary Examiner* — Thomas K Pham
*Assistant Examiner* — Justin W. Hustoft
(74) *Attorney, Agent, or Firm* — KED & ASSOCIATES, LLP

(57) ABSTRACT

A camera module according to an embodiment of the present invention may comprise: a housing including an upper plate section and a side plate section extending from the upper plate section; a first lens disposed on the upper plate section of the housing; a first lens barrel disposed below the upper plate section in the housing; a second lens barrel disposed below the first lens barrel in the housing; a second lens disposed in the first lens barrel; a third lens disposed in the second lens barrel; a first piezo motor which is disposed in the housing and coupled to the first lens barrel, and moves the first lens barrel; and a second piezo motor which is
(Continued)

disposed in the housing and coupled to the second lens barrel, and moves the second lens barrel.

20 Claims, 16 Drawing Sheets

(51) Int. Cl.
*G03B 5/02* (2021.01)
*G03B 13/36* (2021.01)
*H02N 2/02* (2006.01)
*H04N 23/54* (2023.01)

(52) U.S. Cl.
CPC ............. *H02N 2/026* (2013.01); *H04N 23/54* (2023.01); *G03B 2205/0046* (2013.01); *G03B 2205/0061* (2013.01)

(58) Field of Classification Search
CPC .... G03B 2205/0046; G03B 2205/0061; G03B 30/00; H02N 2/026; H04N 23/51; H04N 23/54; H04N 23/55; H04N 23/69
See application file for complete search history.

(56) References Cited

U.S. PATENT DOCUMENTS

| | | | | |
|---|---|---|---|---|
| 2008/0211955 | A1* | 9/2008 | Avital | H04N 23/55 348/E5.028 |
| 2008/0297923 | A1 | 12/2008 | Koc et al. | |
| 2010/0033587 | A1* | 2/2010 | Yumiki | H04N 23/63 348/341 |
| 2011/0292273 | A1 | 12/2011 | Kim et al. | |
| 2012/0200768 | A1 | 8/2012 | Ito | |
| 2014/0362280 | A1* | 12/2014 | Tada | G02B 7/04 359/813 |
| 2016/0056367 | A1* | 2/2016 | Tada | G02B 15/144 359/696 |
| 2016/0377827 | A1 | 12/2016 | Kang et al. | |

FOREIGN PATENT DOCUMENTS

| | | |
|---|---|---|
| CN | 102023364 | 4/2011 |
| CN | 102333190 | 1/2012 |
| CN | 105071691 | 11/2015 |
| CN | 105445889 | 3/2016 |
| CN | 105739217 | 7/2016 |
| JP | 2007-156063 | 6/2007 |
| JP | 2008-076719 | 4/2008 |
| JP | 2008-514978 | 5/2008 |
| JP | 2008-224915 | 9/2008 |
| JP | 2008-259345 | 10/2008 |
| JP | 2008-304663 | 12/2008 |
| JP | 2009128584 | 6/2009 |
| JP | 2009-222878 | 10/2009 |
| JP | 2010-178412 | 8/2010 |
| JP | 2010-243985 | 10/2010 |
| JP | 2011-059395 | 3/2011 |
| JP | 2011-209484 | 10/2011 |
| JP | 2012-008254 | 1/2012 |
| JP | 2014-239575 | 12/2014 |
| JP | 5784241 | 9/2015 |
| JP | 5874016 | 3/2016 |
| JP | 2016-046407 | 4/2016 |
| JP | 2016-090616 | 5/2016 |
| JP | 2017-111305 | 6/2017 |
| JP | 2019-505827 | 2/2019 |
| KR | 10-2011-0057606 | 6/2011 |

OTHER PUBLICATIONS

International Search Report dated Dec. 10, 2020 issued in Application No. PCT/KR2020/012515.
European Search Report dated Oct. 13, 2023 issued in Application No. 20864760.2.
Chinese Office Action dated Oct. 13, 2023 issued in Application No. 202080079425.X.
Chinese Office Action dated May 10, 2023 issued in Application No. 202080079425.X.
European Office Action issued in Application No. 20 864 760.2 dated Mar. 18, 2025.
Japanese Office Action issued in Application No. 2022-516653 dated Jan. 7, 2025.
Korean Office Action dated Apr. 9, 2025, issued in Application No. 10-2019-0113631.
Korean Office Action dated May 20, 2025, issued in Application No. 10-2019-0118193.
Japanese Office Action dated Aug. 26, 2025, issued in Application No. 2022-516653.

* cited by examiner

CAMERA MODULE

CROSS-REFERENCE TO RELATED PATENT APPLICATIONS

This application is a U.S. National Stage Application under 35 U.S.C. § 371 of PCT Application No. PCT/KR2020/012515, filed Sep. 16, 2020, which claims priority to Korean Patent Application Nos. 10-2019-0113631, filed Sep. 16, 2019 and 10-2019-0118193, filed Sep. 25, 2019, whose entire disclosures are hereby incorporated by reference.

Technical Field

The present invention relates to a camera module.

BACKGROUND ART

A portable device such as a tablet PC or a smart phone is provided with a camera module that acquires image information from a subject. The camera module of such a portable device is increasingly required to have a high pixel density and high performance, and recently, products capable of auto focus (AF) and optical zoom in which the focal lengths can be varied are being released.

In general, a camera module provided in a portable device moves a lens in an optical axis direction to adjust autofocus and/or optical zoom. In order to move the lens, a voice coil motor (VCM) type actuator that moves the lens by electromagnetic force by placing a coil and a magnet in the camera module is widely used, and a Hall sensor is used to detect the position and movement of the lens.

However, since the actuator of the existing VCM method has a weak driving force, it is difficult to implement a long stroke for high magnification zoom.

In addition, when the stroke length of the existing VCM actuator is increased for high magnification zoom control, the sizes of coils and magnets are also increasing, thereby making it difficult to miniaturize the camera module.

In addition, the position control range of a Hall sensor of the prior art is shorter than the control range for the high magnification zoom, so there is a problem in that it is difficult to implement the high magnification zoom.

In addition, in recent years, the number of lenses is increasing in order to provide the best optical characteristics, and as the weight of the lens is increasing, there is a problem in that it is difficult to perform a best zoom function with one driving unit.

In particular, there is a problem in that it is difficult to move a lens having a high magnification and a high weight because the driving force of the conventional ball type driving unit is small.

In addition, as the number of lenses increases, the spring-type driving unit of the prior art requires a larger driving force due to drooping of the spring, and there is a problem in that it is difficult to photograph a video due to the vibration of the spring.

DETAILED DESCRIPTION OF THE INVENTION

Technical Subject

An object of the present invention is to provide a camera module capable of high magnification zoom by including a piezo motor and a GMR sensor.

In addition, it is to provide a lens driving device capable of rapidly driving a lens group having a high magnification and a high weight by including a plurality of driving units.

In addition, it is to provide a lens driving device having an increased driving force by using a solenoid type driving unit.

In addition, it is to provide a lens driving device in which optical axis alignment between lens groups is improved by using a pin type guide.

In addition, it is to provide a lens driving device that minimizes an increase in the thickness of the lens driving device due to an increase in the number of driving units.

Technical Solution

A camera module according to an embodiment of the present invention may comprise: a housing including an upper plate part and a side plate part being extended from the upper plate part; a first lens disposed in the upper plate part of the housing; a first lens barrel disposed below the upper plate part inside the housing; a second lens barrel disposed below the first lens barrel inside the housing; a second lens disposed in the first lens barrel; a third lens disposed in the second lens barrel; a first piezo motor which is disposed in the housing and coupled to the first lens barrel, and moves the first lens barrel; and a second piezo motor which is disposed in the housing and coupled to the second lens barrel, and moves the second lens barrel.

In addition, it may include a first magnetic scale disposed in the first lens barrel; and a first sensor disposed in the housing and detecting the first magnetic scale.

In addition, each of the first lens, the second lens, and the third lens may include a plurality of lenses, the first lens may be fixed, and the second lens and the third lens may be individually movable.

In addition, the second lens and the third lens may move in an optical axis direction, and the distance in which the second lens is movable may be greater than the distance in which the third lens is movable.

In addition, the first lens barrel may be coupled to the first piezo motor through a first elastic member.

In addition, the first lens barrel may include a first barrel part accommodating the second lens, and a first guide unit being extended outwardly from the first barrel part and coupled to the first piezo motor.

In addition, the first piezo motor may include a first piezoelectric element disposed in the upper plate part of the housing, and a first pillar being extended from the first piezoelectric element in an optical axis direction.

In addition, it may include a first elastic member disposed between the first guide unit of the first lens barrel and the first pillar of the first piezo motor.

In addition, the second piezo motor includes a second piezoelectric element disposed in the upper plate part of the housing, and a second pillar being extended from the second piezoelectric element in an optical axis direction, wherein the second pillar of the second piezo motor may be disposed opposite to the first pillar of the first piezo motor with respect to the optical axis.

In addition, a first pin is disposed parallel to the first pillar inside the housing, and the first lens barrel may move along the first pin.

In addition, a second pin is disposed in the housing parallel to the second pillar, and the first pin is disposed closer to the first piezo motor than a second pin, and the second pin may be disposed closer to the second piezo motor than the first pin.

In addition, it includes a substrate disposed in the side plate part of the housing; the substrate includes a first portion disposed above the first piezoelectric element of the first piezo motor and a second portion disposed below the first piezoelectric element of the first piezo motor; and the first portion of the substrate may not be overlapped with the second portion of the substrate in an optical axis direction.

In addition, it may include a first buffer member and a second buffer member disposed on the first pillar of the first piezo motor.

In addition, the second lens barrel includes a second barrel part accommodating the third lens, and a second guide unit being extended outwardly from the second barrel part and coupled to the second piezo motor, wherein at least a portion of the first guide unit may be overlapped with the second guide unit in a direction perpendicular to the optical axis in an initial state to which no current is applied.

A lens driving device according to a second embodiment of the present invention includes: a lens barrel; a first driving unit disposed on an outer circumferential surface of the lens barrel; a second driving unit disposed on the outer circumferential surface of the lens barrel to be spaced apart from the first driving unit; a third driving unit disposed on the outer circumferential surface of the lens barrel to be spaced apart from the first driving unit and the second driving unit, wherein a first angle formed by a first virtual straight line connecting an optical axis and the first driving unit and a second virtual straight line connecting the optical axis and the second driving unit may be smaller than a second angle formed by a third virtual straight line connecting the optical axis and the third driving unit and the first straight line, and a third angle formed by the second straight line and the third straight line.

In addition, the first driving unit includes: a first yoke disposed in the lens barrel; a first coil disposed in the first yoke; and a first magnet facing the first coil, wherein the first yoke includes: a first side plate disposed in the lens barrel; a second side plate facing the first side plate; an upper plate connecting the first side plate and the second side plate; and a lower plate, wherein the first coil may be wound around the second side plate of the first yoke.

In addition, the first magnet may be formed to be longer than a length of the second side plate in the optical axis direction.

In addition, the lens barrel may include a groove formed in the outer circumferential surface of the lens barrel, and the first side plate of the first yoke may be disposed in the groove.

In addition, at least a portion of the lens driving device may include a pin for guiding movement of the lens barrel in the optical axis direction by being in contact with the lens barrel.

In addition, the lens barrel has a first side surface, a second side surface facing the first side surface, and a third side surface and a fourth side surface connecting the first side surface and the second side surface including, wherein the first driving unit and the second driving unit may be disposed on the first side surface of the lens barrel, and the third driving unit may be disposed on the second side surface of the lens barrel.

In addition, the pin includes: a first pin disposed on the third side surface of the lens barrel; and a second pin disposed on the fourth side surface, wherein the first pin is disposed closer to the third driving unit than to the first driving unit, and wherein the second pin may be disposed closer to the third driving unit than to the second driving unit.

In addition, the lens barrel includes a groove formed on the outer circumferential surface of the lens barrel and in which the pin is disposed, wherein the groove of the lens barrel includes: a first groove formed on the third side surface and in which the first pin is disposed, and a second groove formed in the fourth side surface and in which the second pin is disposed, and wherein the first groove and the second groove may be formed in different shapes.

In addition, the first groove may include a curved surface being in contact with the first pin, and the second groove may include two inclined surfaces being in contact with the second pin.

In addition, the second angle and the third angle may be the same.

In addition, the second and third angles may be greater than 120° and smaller than 180°.

In addition, an angle formed by the third straight line and the first straight line may be the same as an angle formed by the third straight line and the second straight line.

The camera module according to a second embodiment of the present invention may include a lens driving device according to a second embodiment of the present invention.

Advantageous Effects

Through this embodiment, it is possible to provide a camera module capable of high magnification zoom. In addition, it is possible to provide a lens driving device capable of rapidly driving a lens group having a high magnification and a high weight by including a plurality of driving units.

In addition, the driving force may be increased by using a solenoid type driving unit.

In addition, optical axis alignment between lens groups may be improved by using a pin type guide.

In addition, it is possible to minimize an increase in the thickness of the lens driving device due to an increase in the number of driving units.

BEST MODE

Figure 1:
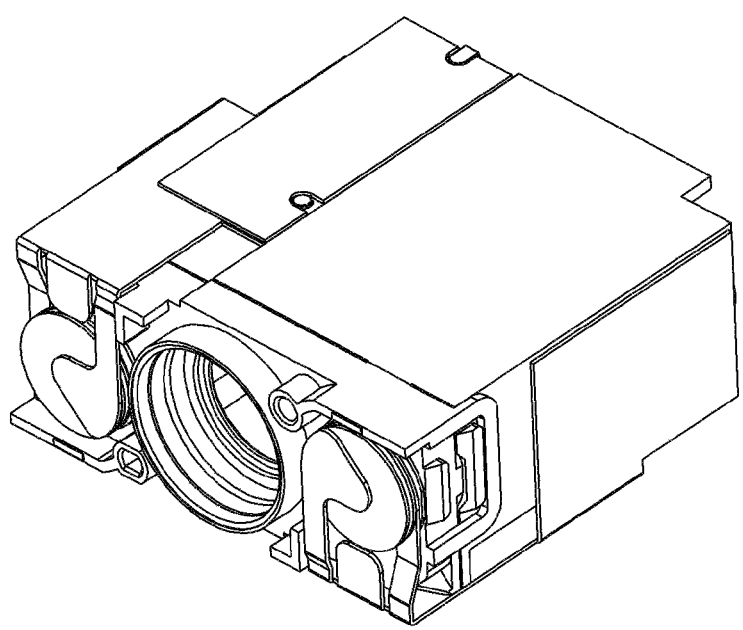
FIG. 1 is a perspective view of a camera module according to a first embodiment of the present invention.

Hereinafter, preferred embodiments of the present invention will be described in detail with reference to the accompanying drawings.

However, the technical idea of the present invention is not limited to some embodiments to be described, but may be implemented in various forms, and within the scope of the technical idea of the present invention, one or more of the constituent elements may be selectively combined or substituted between embodiments.

In addition, the terms (including technical and scientific terms) used in the embodiments of the present invention, unless explicitly defined and described, can be interpreted as a meaning that can be generally understood by a person skilled in the art, and commonly used terms such as terms defined in the dictionary may be interpreted in consideration of the meaning of the context of the related technology.

In addition, terms used in the present specification are for describing embodiments and are not intended to limit the present invention.

In the present specification, the singular form may include the plural form unless specifically stated in the phrase, and when described as "at least one (or more than one) of A and B and C", it may include one or more of all combinations that can be combined with A, B, and C.

In addition, in describing the components of the embodiment of the present invention, terms such as first, second, A, B, (a), and (b) may be used. These terms are merely intended to distinguish the components from other components, and the terms do not limit the nature, order or sequence of the components.

And, when a component is described as being 'connected', 'coupled' or 'interconnected' to another component, the component is not only directly connected, coupled or interconnected to the other component, but may also include cases of being 'connected', 'coupled', or 'interconnected' due that another component between that other components.

In addition, when described as being formed or arranged in "on (above)" or "below (under)" of each component, "on (above)" or "below (under)" means that it includes not only the case where the two components are directly in contact with, but also the case where one or more other components are formed or arranged between the two components. In addition, when expressed as "on (above)" or "below (under)", the meaning of not only an upward direction but also a downward direction based on one component may be included.

An 'optical axis direction' being used below is defined as an optical axis direction of a lens and/or an image sensor being coupled to a camera module.

The 'vertical direction' being used below may be a direction parallel to an optical axis direction. The vertical direction may correspond to a 'z-axis direction'. A 'horizontal direction' being used below may be a direction perpendicular to a vertical direction. That is, a horizontal direction may be a direction perpendicular to an optical axis. Accordingly, a horizontal direction may include an 'x-axis direction' and a 'y-axis direction'.

An 'auto focus function' used below is defined as a function for automatically focusing on a subject by adjusting the distance to an image sensor by moving a lens in an optical axis direction according to the distance of the subject so that a clear image of the subject can obtained in the image sensor. Meanwhile, 'auto focus' may correspond to 'auto focus (AF)'. In addition, 'closed-loop auto focus (CLAF) control' is defined as real-time feedback control of the position of a lens by detecting the distance between an image sensor and a lens to improve focus adjustment accuracy.

Hereinafter, the configuration of a camera module according to a first embodiment of the present invention will be described with reference to the drawings.

Figure 2:
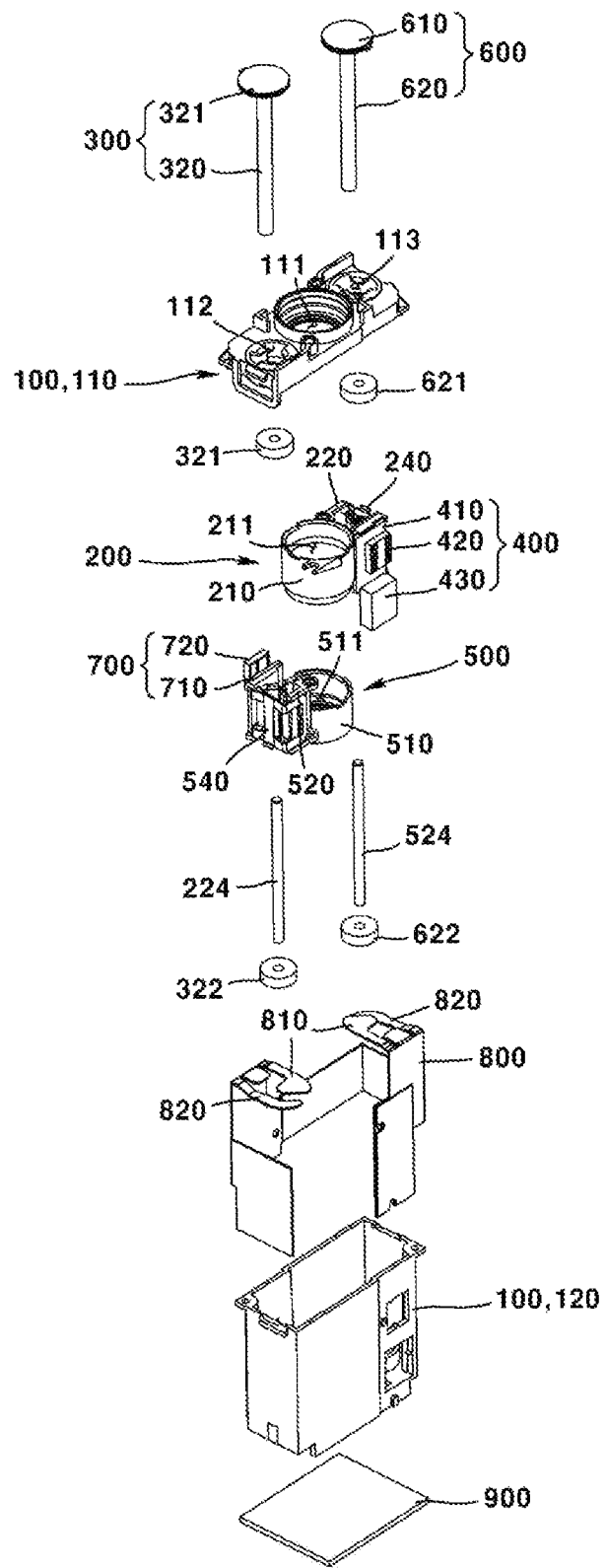
FIG. 2 is an exploded perspective view of a camera module according to a first embodiment of the present invention.
Figure 3:
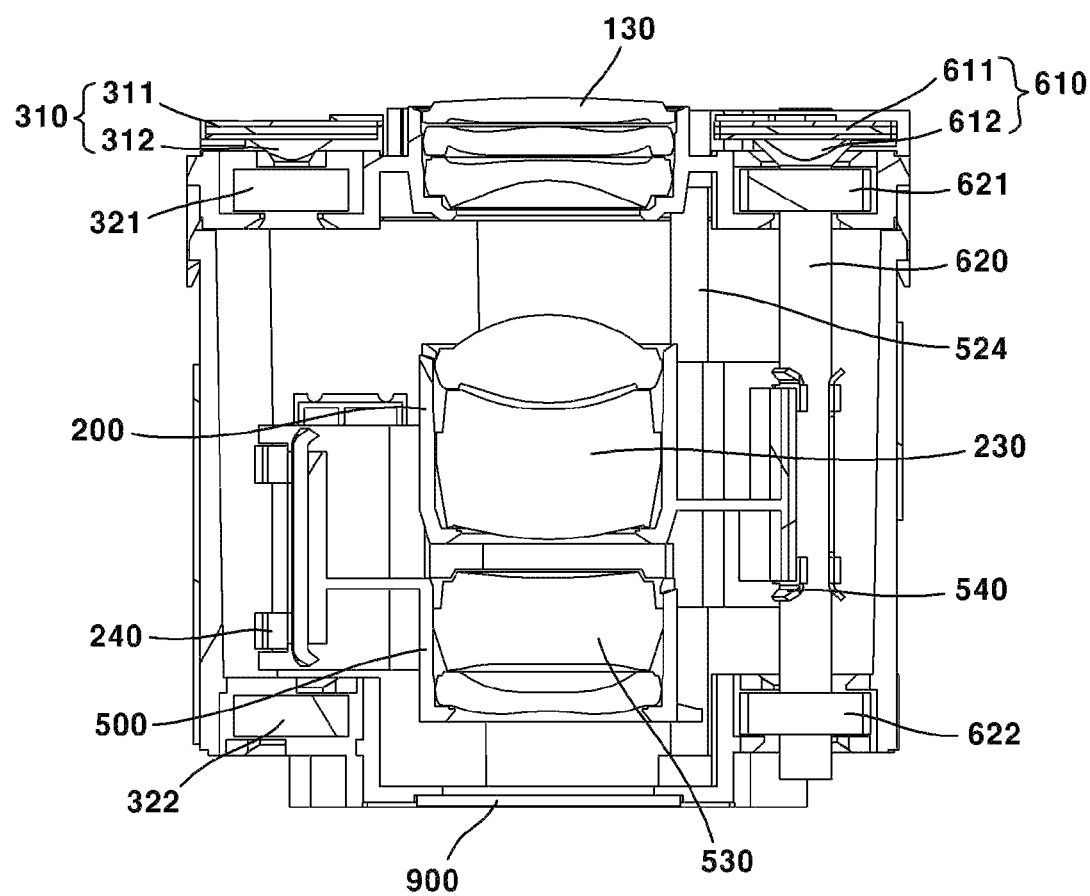
FIG. 3 is a cross-partial view of a camera module according to a first embodiment of the present invention.
Figure 4:
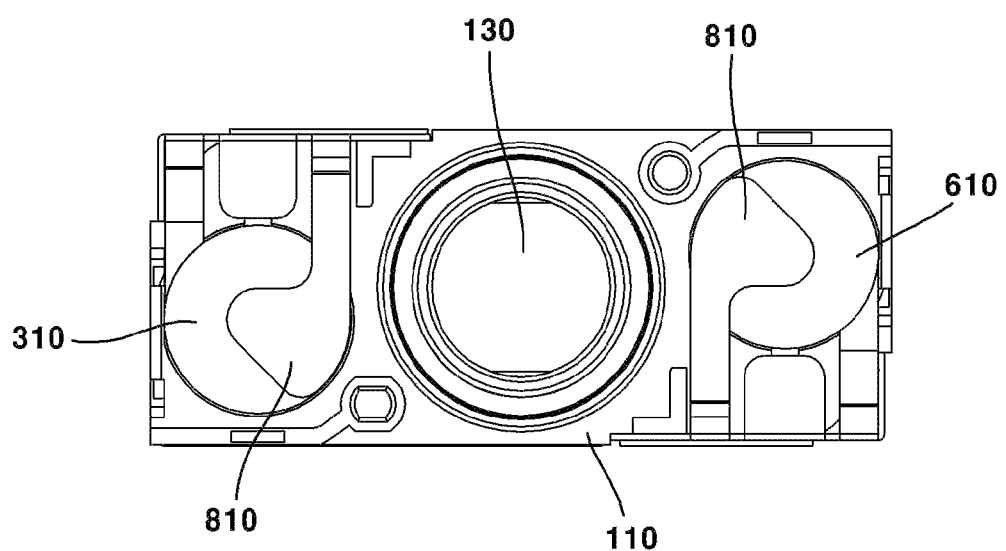
FIG. 4 is a front view of a camera module according to a first embodiment of the present invention.
Figure 5:
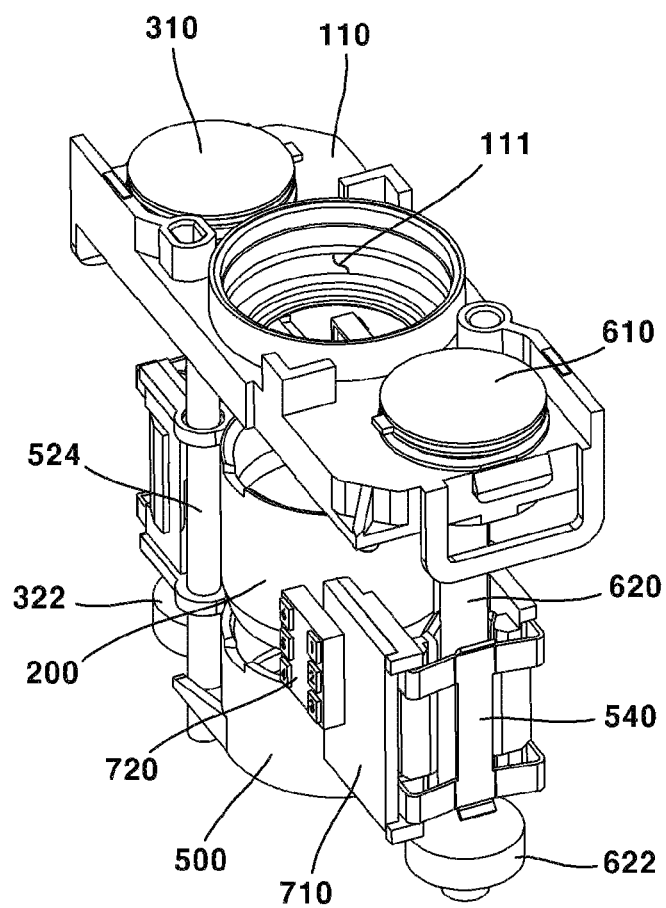
FIG. 5 is a perspective view of a state in which the side plate part of a housing of a camera module according to a first embodiment of the present invention is removed.
Figure 6:
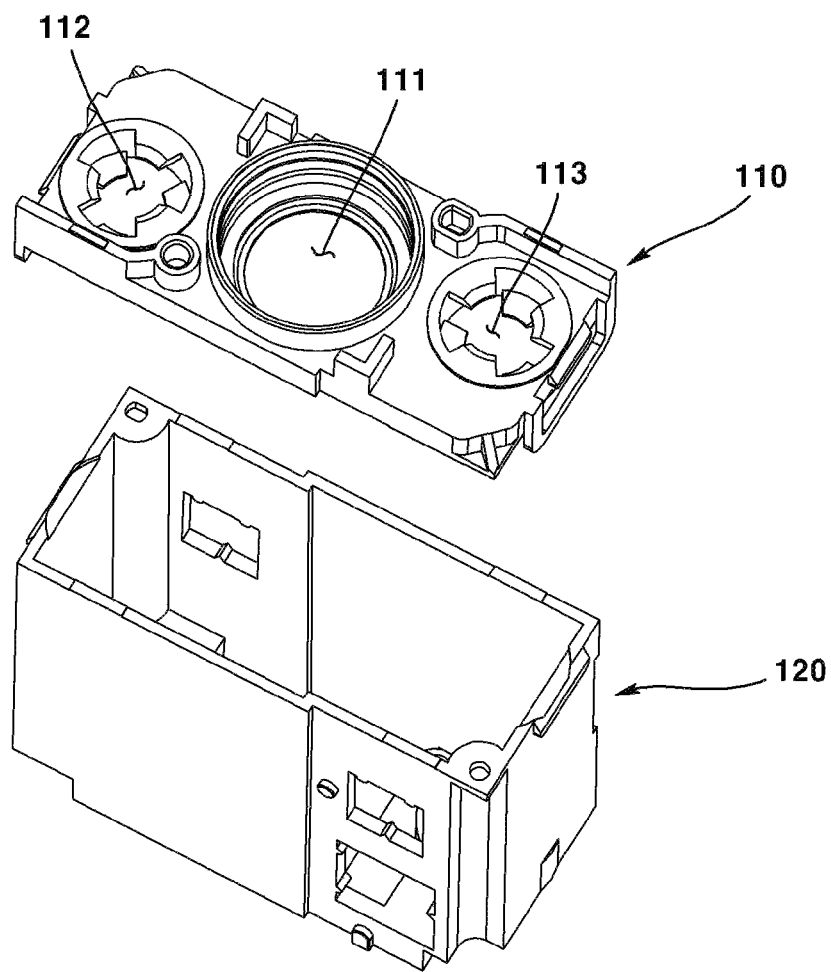
FIGS. 6 to 9 are perspective views of partial configurations of a camera module according to a first embodiment of the present invention.
Figure 7:
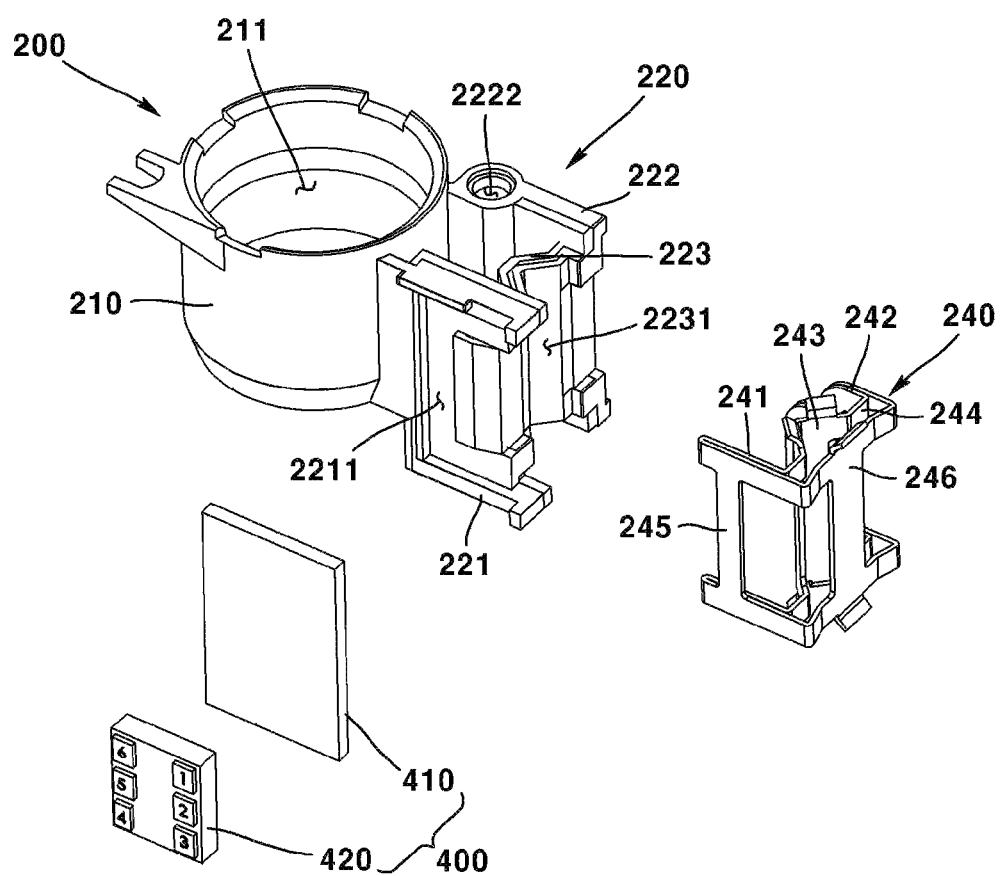
Figure 8:
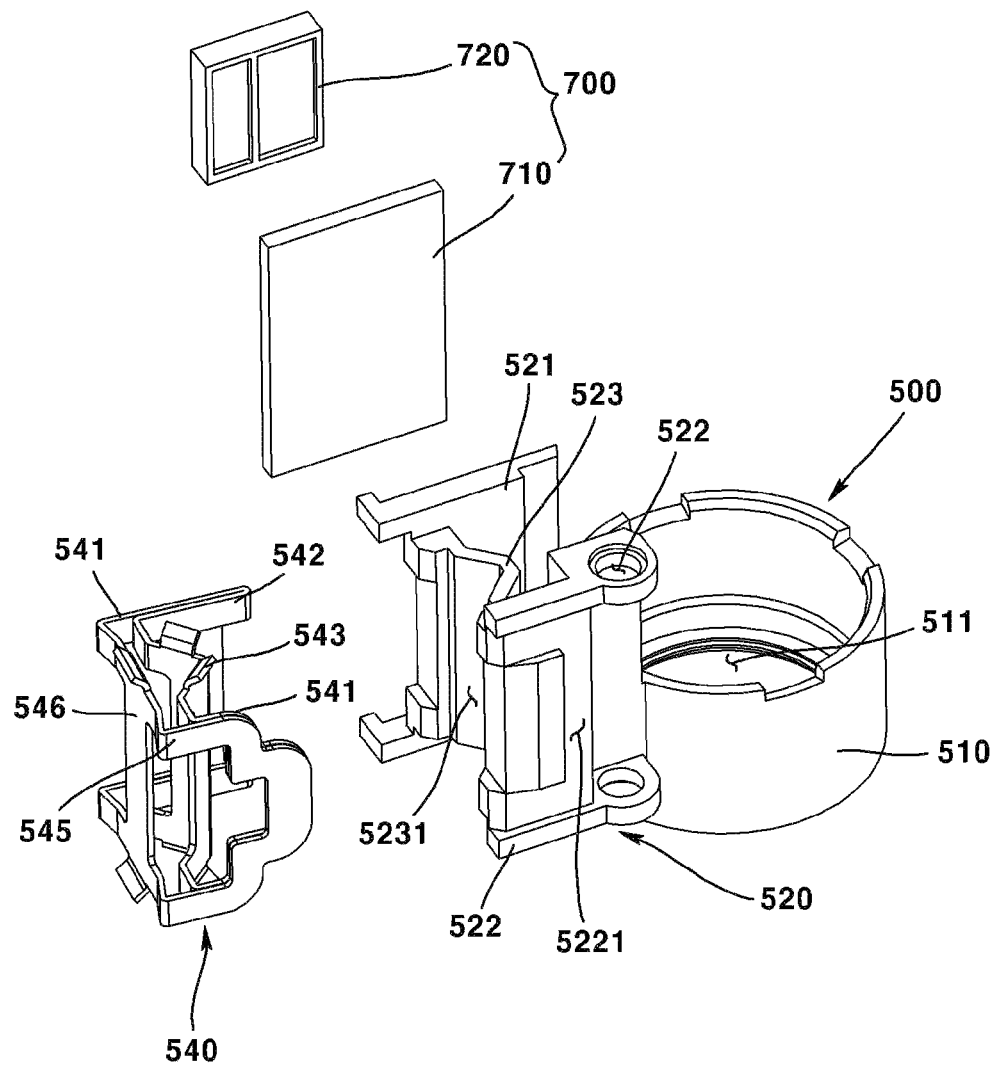
Figure 9:
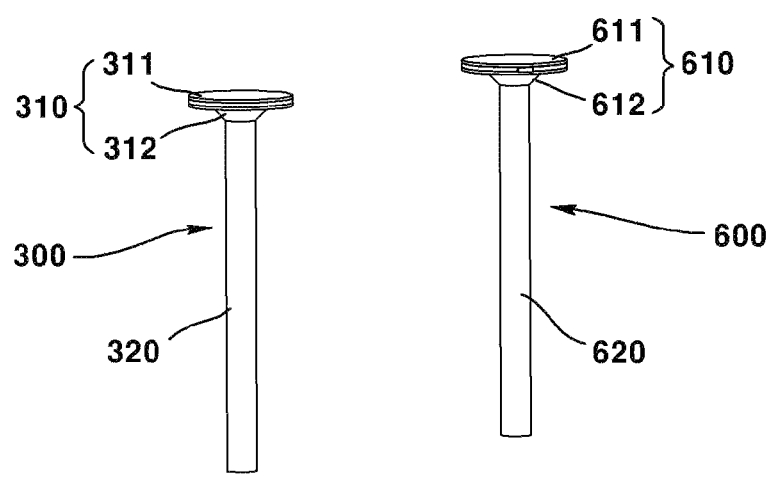
Figure 10:
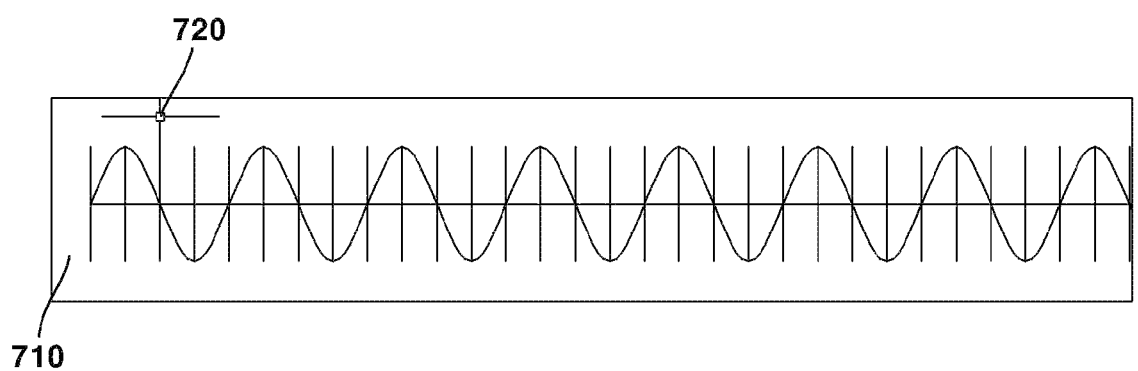
FIG. 10 is a conceptual diagram of a sensor of a camera module according to a first embodiment of the present invention.

FIG. 1 is a perspective view of a camera module according to a first embodiment of the present invention. FIG. 2 is an exploded perspective view of a camera module according to a first embodiment of the present invention. FIG. 3 is a cross-partial view of a camera module according to a first embodiment of the present invention. FIG. 4 is a front view of a camera module according to a first embodiment of the present invention. FIG. 5 is a perspective view of a state in which the side plate part of a housing of a camera module according to a first embodiment of the present invention is removed. FIGS. 6 to 9 are perspective views of partial configurations of a camera module according to a first embodiment of the present invention. FIG. 10 is a conceptual diagram of a sensor of a camera module according to a first embodiment of the present invention.

The camera module 10 may include a housing 100. The housing 100 may form the outer appearance of the camera module. The housing 100 may be formed in a hexahedral shape with an open lower surface.

The housing 100 may include an upper plate part 110. A first hole 111 may be formed in an upper plate part 100. The first hole 111 may be a hollow hole. A thread may be formed on an inner circumferential surface of the first hole 111. The first lens 130 may be disposed in the first hole 111. The first lens 130 may be coupled to the first hole 111. A second hole 112 may be formed in the upper plate part 110. The second hole 112 may be spaced apart from the first hole 111. A third hole 113 may be formed in the upper plate part 110. The third hole 113 may be spaced apart from the first hole 111 and the second hole 112. A first hole 111 may be disposed between the second hole 112 and the third hole 113.

The second hole 112 may include a protrusion being protruded inward from an inner surface of the second hole 112. The protrusion may include a plurality of protrusions. The plurality of protrusions may include a first protrusion disposed at an upper end of the second hole 112 and a second protrusion disposed at a lower end of the second hole 112. The first protrusion may include first-first to first-third protrusions that are spaced apart from one another. The first protrusion may include first-first to first-third protrusions that are spaced apart from one another. The first-first to first-third protrusions may be spaced apart at equal intervals along the circumferential direction of the second hole 112.

The second protrusion may include second-first to second-third protrusions spaced apart from one another. The second-first to second-third protrusions may be spaced apart from one another at equal intervals along the circumferential direction of the second hole 112. The first protrusion may not be overlapped with the second protrusion in an optical axis direction. When viewed from a plane, a second-first protrusion is disposed between a first-first protrusion and a first-second protrusion; a second-second protrusion is disposed between a first-second protrusion and a first-third protrusion; and a second-third protrusion may be disposed between a first-third protrusion and a first-first protrusion.

A first buffer member 321 may be disposed in the second hole 112. The first buffer member 321 may be disposed between the first protrusion and the second protrusion of the second hole 112. The first buffer member 321 may include a hole. The first pillar 320 of the first piezo motor 300 may penetrate through the second hole 112. The first pillar 320 of the first piezo motor 300 may be disposed in the hole of the first buffer member 321. At least a portion of the first piezoelectric element 310 of the first piezo motor 300 may be disposed in the second hole 112.

The third hole 113 may include a protrusion being protruded inward from an inner surface of the third hole 113. The protrusion may include a plurality of protrusions. The plurality of protrusions may include a third protrusion disposed at an upper end of the third hole 113 and a fourth protrusion disposed at a lower end of the third hole 113. The third protrusion may include third-first to third-third protrusions that are spaced apart from one another. Each of the third-first to third-third protrusions may be spaced apart from one another at equal intervals along a circumferential direction of the third hole 113. The fourth protrusion may include fourth-first to fourth-third protrusions that are spaced apart from one another. Each of the fourth-first to fourth-third protrusions may be spaced apart from one another at equal intervals along a circumferential direction of the third hole 113. The third protrusion may not be overlapped with the fourth protrusion in an optical axis direction. When viewed from a plane, a fourth-first protrusion is disposed between a third-first protrusion and a third-second protrusion; a fourth-second protrusion is disposed between a third-second protrusion and a third-third protrusion; and a fourth-third protrusion may be disposed between a third-third protrusion and a third-first protrusion.

A third buffer member 621 may be disposed in the third hole 113. The third buffer member 621 may be disposed between the third and fourth protrusions of the third hole 113. The third buffer member 621 may include a hole. A second pillar 620 of the second piezo motor 600 may penetrate through the third hole 113. The second pillar 620 of the second piezo motor 600 may be disposed in a hole of the third buffer member 621. At least a portion of the second piezoelectric element 610 of the second piezo motor 600 may be disposed in the third hole 113.

The housing 100 may include a side plate part 120. The side plate part 120 may be disposed below the upper plate part 110. In the side plate part 120, a first lens barrel 200, a first piezo motor 300, a first sensor assembly 400, a second lens barrel 500, a second piezo motor 600, and a second sensor assembly 700 may be disposed. The side plate part 120 may be coupled with the upper plate part 110.

The camera module 10 may include a first lens barrel 200. The first lens barrel 200 may be disposed in the housing 100. The first lens barrel 200 may be disposed below the upper plate part 110 of the housing 100. The first lens barrel 200 may be disposed in the side plate part 120 of the housing 100. The first lens barrel 200 may be coupled through the first piezo motor 300 and the first elastic member 240.

The first lens barrel 200 may include a first barrel part 210. The first barrel part 210 may have a cylindrical shape with upper and lower surfaces thereof are open. The first barrel part 210 may accommodate the second lens 230. The first barrel part 210 may include a hole 211. The inner circumferential surface of the hole 211 of the first barrel part 210 may be formed with a thread. A second lens 230 may be disposed in the first barrel part 210. The second lens 230 may be disposed in the hole 211 of the first barrel part 210. The second lens 230 may be coupled to a hole of the first barrel part 210.

The first lens barrel 200 may include a first guide unit 220. The first guide unit 220 may be extended outwardly from the first barrel part 210. The first guide unit 220 may include a first side plate 221 and a second side plate 222 being extended outwardly from the first barrel part 210 and disposed opposite to each other. The first guide unit 220 may include a connection portion 223 for connecting the first side plate 221 and the second side plate 222 of the first guide unit 220. The first side plate 221 of the first guide unit 220 may include a groove 2211. The groove 2211 of the first side plate 221 of the first guide unit 220 may be formed by being recessed inwardly from an outer surface of the first side plate 221 of the first guide unit 220. A first magnetic scale 410 may be disposed in the first side plate 221 of the first guide unit 220. The first magnetic scale 410 may be disposed on an outer surface of the first side plate 221 of the first guide unit 220. The second side plate 222 of the first guide unit 220 may include a groove. The connection portion 223 of the first guide unit 220 may include a groove 2231. The groove 2231 of the connection portion 223 of the first guide unit 220 may be formed in a 'V' shape.

A hole 2222 may be formed in the second side plate 222 of the first guide unit 220. A first pin 224 may be disposed in the hole 2222 of the first guide unit 220. The first pin 224 may penetrate through the hole 2222 of the first guide unit 220. At least a portion of the first guide unit 220 may be overlapped with the second guide unit 520 in a direction perpendicular to an optical axis in an initial state in which no current is applied.

The first guide unit 220 may be coupled to the first piezo motor 300. The first guide unit 220 may be coupled to the first pillar 320 of the first piezo motor 300. The first pillar 320 may be coupled to the first guide unit 220 through the first elastic member 240.

The first guide unit 220 may include a first pin 224. The first pin 224 may be disposed inside the housing 100. The first pin 224 may be disposed parallel to the second pillar 620 inside the housing 100. The first pin 224 may be disposed closer to the first piezo motor 300 than the second pin 524. The first pin 224 may be disposed closer to the first piezo motor 300 than the second pin 524. The first pin 224 may be disposed in the second side plate 222 of the first guide unit 220. The first pin 224 may penetrate through the hole 2222 of the second side plate 222. The first pin 224 may be coupled to the upper plate part 110 of the housing 100. An upper end of the first pin 224 may be coupled to the upper plate part 110 of the housing 100. The first pin 224 may guide the movement of the first lens barrel 200 in an optical axis direction. Through this, the second lens 230 disposed in the first lens barrel 200 may perform a zooming function.

The first pin 224 may be disposed in the second lens barrel 500. The first pin 224 may guide the movement of the second lens barrel 500 in an optical axis direction. Through this, the third lens 530 disposed in the second lens barrel 500 may perform an autofocus function.

The first lens barrel 200 may include a first elastic member 240. The first elastic member 240 may be disposed in the first lens barrel 200. The first elastic member 240 may be disposed in the first guide unit 220.

The first elastic member 240 may include first to sixth regions 241, 242, 243, 244, 245, and 246. The first region 241 may be disposed in the first side plate 221 of the first guide unit 220. The first region 241 may be disposed in the groove 2211 of the first side plate 221 of the first guide unit 220. The second region 242 may be disposed opposite to the first region 241 and may be disposed in the second side plate 222 of the first guide unit 220. The second region 242 may be disposed in a groove of the second side plate 222 of the first guide unit 220. The third region 243 may connect the first region 241 and the second region 242. The third region 243 may be disposed in the connection portion 223 of the first guide unit 220. The third region 243 may be formed in a shape corresponding to the connecting portion 223 of the first guide unit 220. The third region 243 may be formed in a shape corresponding to the groove 2231 of the connection portion 223 of the first guide unit 220. The third region 243 may include a portion to be formed in a 'V' shape. A central portion of the third region 243 may be formed in a 'V' shape. The fourth region 244 may be connected to the second region 242 and may be disposed in the second side plate 222 of the first guide unit 220. The fourth region 244 may be disposed at an outer side of the second region 242. The fourth region 244 may be extended longer than the second region 242. At least a portion of the fourth region 244 may be overlapped with the second region 242. The fifth region 245 may be disposed at an outer side of the first region 241. The fifth region 245 may be disposed in the first side plate 221 of the first guide unit 220. The fifth region 245 may be disposed in the groove 2211 of the first side plate 221 of the second guide unit 220. The fifth region 245 may be extended longer than the first region 241. At least a portion of the fifth region 245 may be overlapped with the first region 241. The sixth region 246 may connect the fourth region 244 and the fifth region 245. The sixth region 246 may face the third region 243. The sixth region 246 may be spaced apart from the third region 243. A first pillar 320 of the first piezo motor 300 may be disposed between the third region 243 and the sixth region 246. Through this, the first piezo motor 300 may be firmly fixed.

The camera module 10 may include a first piezo motor 300. The first piezo motor 300 may be disposed in the housing 100. The first piezo motor 300 may be coupled to the first lens barrel 200. The first piezo motor 300 may move the first lens barrel 200. The first piezo motor 300 may move the first lens barrel 200 in an optical axis direction. The first piezo motor 300 may be an ultrasonic motor.

The first piezo motor 300 may include a first piezoelectric element 310. The first piezoelectric element 310 may be disposed in the upper plate part 110 of the housing 100. The first piezoelectric element 310 may include a disc part 311. The disc part 311 may be disposed in the second hole 112 of the upper plate part 110. The disc part 311 may be disposed above a first protrusion of the second hole 112 of the upper plate part 110. The upper plate part 110 may be disposed above first-first to first-third protrusions of a first protrusion of the second hole 112.

The first piezoelectric element 310 may include a protruded portion 312. The protruded portion 312 may be extended downward from the disc part 311. The protruded portion 312 may have an upper end disposed on the disc part 311 and a lower end disposed in the first pillar 320. A maximum diameter of the protruded portion 312 in a direction perpendicular to an optical axis direction may be smaller than a diameter of the disc part 311 in a corresponding direction. The protruded portion 312 may have a smaller diameter as it travels down from the disc part 311. The diameter of the lower end of the protruded portion 312 may be the same as the diameter of the first pillar 320. At least a portion of the protruded portion 312 may be disposed in the second hole 112 of the upper plate part 110. The protruded portion 312 may include a hole. An upper end of the first pillar 320 may be disposed in the hole of the protruded portion 312.

The first piezoelectric element 310 may be contracted or expanded by a voltage applied from the substrate 800. The first piezoelectric element 310 may receive a voltage from the first portion 810 of the substrate 800. The first piezoelectric element 310 may contract or expand along an optical axis direction. The first piezoelectric element 310 may contract or expand in a longitudinal direction thereof according to a direction in which a voltage is applied. The first piezoelectric element 310 may generate vibration by contracting or expanding.

The first piezo motor 300 may include a first pillar 320. The first pillar 320 may be extended from the first piezoelectric element 310 in an optical axis direction. The first pillar 320 may be disposed in the first lens barrel 200. The first pillar 320 may be disposed in the first guide unit 220. The first pillar 320 may be coupled to the first guide unit 220 by the first elastic member 240. The first pillar 320 may be disposed between the third region 243 and the sixth region 246 of the first elastic member 240. The first pillar 320 may be fixed to the first guide unit 220 by the elastic force of the first elastic member 240. The first pillar 320 may be disposed opposite to the second pillar 620 of the second piezo motor 600 with respect to an optical axis. The first pillar 320 may be disposed parallel to the first pin 224. The first pillar 320 may be parallel to an optical axis direction.

The first pillar 320 may transmit the vibration generated from the first piezoelectric element 310 to the first lens barrel 200. At this time, the first lens barrel 200 may be moved upward or downward according to the vibration direction of the first pillar 320. Through this, the second lens 230 inside the first lens barrel 200 is moved together and a zooming function of zooming up or zooming out may be performed. The first pillar 320 may be contracted or expanded by vibration generated from the first piezoelectric element 310. The first pillar 320 may transmit vibration in an upper direction or a lower direction according to a direction in which a voltage is applied.

The first pillar 320 may include a first buffer member 321. The first buffer member 321 may be disposed on the first pillar 320. The first buffer member 321 may be coupled to an upper portion of the first pillar 320. The first buffer member 321 may be disposed in the second hole 112 of the upper plate part 110. The first pillar 320 may include a second buffer member 322. The second buffer member 322 may be disposed in the first pillar 320. The second buffer member 322 may be coupled to a lower portion of the first pillar 320. The second buffer member 322 may be disposed below the first buffer member 321. The second buffer member 322 may be spaced apart from the first buffer member 321 in an optical axis direction. The first and second buffer members 321 and 322 may prevent noise caused by vibration of the first pillar 320. The first and second buffer members 321 and 322 may prevent the first pillar 320 from being deformed or destroyed by an external impact.

The camera module 10 may include a first sensor assembly 400. The first sensor assembly 400 may include a magnetoresistive sensor (MR sensor). The first sensor assembly 400 may include a giant magnetoresistive sensor (GMR sensor). The first sensor assembly 400 may detect the position and movement of the second lens 230.

The first sensor assembly 400 may include a first magnetic scale 410. The first magnetic scale 410 may be disposed in the first lens barrel 200. The first magnetic scale 410 may be disposed in the first guide unit 220. The first magnetic scale 410 may be disposed on the first side surface 221 of the first guide unit 220. The first magnetic scale 410 may include a magnet. The first magnetic scale 410 may include a plurality of magnets. The first magnetic scale 410 may have an N pole and an S pole intersected therebetween. The first magnetic scale 410 may have N poles and S poles alternately disposed. The first magnetic scale 410 may be moved along an optical axis direction together with the first lens barrel 200.

The first sensor assembly 400 may include a first sensor 420. The first sensor 420 may be disposed in the housing 100. The first sensor 420 may be disposed in the side plate part 120 of the housing 100. The first sensor 420 may face the first magnetic scale 410. The first sensor 420 may be disposed to be spaced apart from the first magnetic scale 410 in a direction perpendicular to an optical axis. The first sensor 420 may recognize the position of the first magnetic scale 410. Through this, the position of the first lens barrel 200 moving together with the first magnetic scale 410 may be recognized.

The first sensor assembly 400 may include a gyro sensor 430. The gyro sensor 430 may be disposed below the first sensor 420. The gyro sensor 430 may be spaced apart from the first sensor 420. At least a portion of the gyro sensor 430 may be overlapped with the first magnetic scale 410 in a direction perpendicular to an optical axis. The gyro sensor 430 may be disposed in the side plate part 120 of the housing 100. The gyro sensor 430 may detect the movement of the camera user.

The camera module 10 may include a second lens barrel 500. The second lens barrel 500 may be disposed in the housing 100. The second lens barrel 500 may be disposed below the upper plate part 110 of the housing 100. The second lens barrel 500 may be disposed in the side plate part 120 of the housing 100. The second lens barrel 500 may be disposed below the first lens barrel 200. The second lens barrel 500 may be spaced apart from the first lens barrel 200 in an optical axis direction. The second lens barrel 500 may be coupled with the second piezo motor 600 through the second elastic member 540.

The second lens barrel 500 may include a second barrel part 510. The second barrel part 510 may have an open cylindrical shape with upper and lower surfaces. The second barrel part 510 may accommodate the third lens 530. The second barrel part 510 may include a hole 511. The inner circumferential surface of the hole 511 of the second barrel part 510 may be formed with a thread. A third lens 530 may be disposed in the second barrel part 510. The third lens 530 may be disposed in the hole 511 of the second barrel part 510. The third lens 530 may be coupled to the hole 511 of the second barrel part 510.

The second lens barrel 500 may include a second guide unit 520. The second guide unit 520 may be extended outwardly from the second barrel part 510. The second guide unit 520 may include a first side plate 521 and a second side plate 522 being extended outwardly from the second barrel part 510 and disposed opposite to each other. The second guide unit 520 may include a connection part 523 connecting the first side plate 521 and the second side plate 522 of the second guide unit 520. The first side plate 521 of the second guide unit 520 may include a groove. The groove of the first side plate 521 of the second guide unit 520 may be formed by being recessed inwardly from the outer surface of the first side plate 521 of the second guide unit 520. A second magnetic scale 710 may be disposed in the first side plate 521 of the second guide unit 520. The second magnetic scale 710 may be disposed on an outer surface of the first side plate 521 of the second guide unit 520. The second side plate 522 of the second guide unit 520 may include a groove 5221. The connection part 523 of the second guide unit 520 may include a groove 5231. The groove 5231 of the connection part 523 of the second guide unit 520 may be formed in a 'V' shape.

A hole 5222 may be formed in the second side plate 522 of the second guide unit 520. A second pin 524 may be disposed in the hole 5222 of the second side plate 522 of the second guide unit 520. A second pin 524 may penetrate through the hole 5222 of the second guide unit 520.

The second guide unit 520 may be coupled to the second piezo motor 600. The second guide unit 520 may be coupled to the second pillar 620 of the second piezo motor 600. The second pillar 620 may be coupled with the second guide unit 520 through a second elastic member 540.

The second guide unit 520 may include a second pin 524. The second pin 524 may be disposed in the housing 100. The second pin 524 may be disposed parallel to the first pillar 320 in the housing 100. The second pin 524 may be disposed adjacent to the second piezo motor 600 than the first pin 224. The second pin 524 may be disposed closer to the second piezo motor 600 than the first pin 224.

The second pin 524 may be disposed in the second side plate 522 of the second guide unit 520. The second pin 524 may penetrate the hole 5222 of the second side plate 522. The second pin 524 may be coupled to the upper plate part 110 of the housing 100. An upper end of the second pin 524 may be coupled to the upper plate part 110 of the housing 100. The second pin 524 may guide the movement of the second lens barrel 500 in an optical axis direction. Through this, the third lens 530 disposed in the second lens barrel 500 may perform a focus function. The second pin 524 may be spaced apart from the first pin 224.

The second pin 524 may be disposed in the first lens barrel 200. The second pin 524 may guide the movement of the first lens barrel 200 in an optical axis direction. Through this, the second lens 230 disposed in the first lens barrel 200 may perform a zooming function.

The second lens barrel 500 may include a second elastic member 540. The second elastic member 540 may be disposed in the second lens barrel 500. The second elastic member 540 may be disposed in the second guide unit 520.

The second elastic member 540 may include first to sixth regions 541, 542, 543, 544, 545, and 546. The first region 541 may be disposed in the second side plate 522 of the second guide unit 520. The first region 541 may be disposed in the groove 5221 of the second side plate 522 of the second guide unit 520. The second region 542 may be disposed opposite to the first region 541 and may be disposed in the first side plate 521 of the second guide unit 520. The second region 542 may be disposed in a groove of the first side plate 521 of the second guide unit 520. The third region 543 may connect the first region 541 and the second region 542. The third region 543 may be disposed on the connection portion 523 of the second guide unit 520. The third region 543 may be formed in a shape corresponding to the connection portion 523 of the second guide unit 520. The third region 543 may be formed in a shape corresponding to the groove 5231 of the connection portion 523 of the second guide unit 520. The third region 543 may include a portion to be formed in a 'V' shape. A central portion of the third region 543 may be formed in a 'V' shape. The fourth region 544 may be connected to the second region 542 and be disposed on the first side plate 521 of the second guide unit 520. The fourth region 544 may be disposed at an outer side of the second region 542. The fourth region 544 may be extended longer than the second region 542. At least a portion of the fourth region 544 may be overlapped with the second region 542. The fifth region 545 may be disposed at an outer side of the first region 541. The fifth region 545 may be disposed on the second side plate 521 of the second guide unit 520. The fifth region 545 may be disposed in the groove 5221 of the second side plate 522 of the second guide unit 520. The fifth region 545 may be extended longer than the first region 541. At least a portion of the fifth region 545 may be overlapped with the first region 541. The sixth region 546 may connect the fourth region 544 and the fifth region 545. The sixth region 546 may face the third region 543. The sixth region 546 may be spaced apart from the third region 543. A second pillar 620 of the second piezo motor 600 may be disposed between the third region 543 and the sixth region 546. Through this, the second piezo motor 600 may be firmly fixed.

The camera module 10 may include a second piezo motor 600. The second piezo motor 600 may be disposed in the housing 100. The second piezo motor 600 may be disposed in the second lens barrel 500. The second piezo motor 600 may be coupled to the second lens barrel 500. The second piezo motor 600 may move the second lens barrel 500. The second piezo motor 600 may move the second lens barrel 500 in an optical axis direction. The second piezo motor 600 may be an ultrasonic motor.

The second piezo motor 600 may include a second piezoelectric element 610. The second piezoelectric element 610 may be disposed in the upper plate part 110 of the housing 100. The second piezoelectric element 610 may include a disc part 611. The disc part 611 may be disposed in the third hole 113 of the upper plate part 110. The disc part 611 may be disposed on a third protrusion of the third hole 113 of the upper plate part 110. The upper plate part 110 may be disposed on the third-first to third-third protrusions of the third protrusion of the third hole 113.

The second piezoelectric element 610 may include a protruded portion 612. The protruded portion 612 may be extended downward from the disc part 611. The protruded portion 612 may have an upper end disposed on the disc part 611 and a lower end disposed in the second pillar 620. A maximum diameter of the protruded portion 612 in a direction perpendicular to the optical axis direction may be smaller than a diameter of the disc part 611 in a corresponding direction. The protruded portion 612 may have a smaller diameter as it travels down from the disc part 611. The diameter of the lower end of the protruded portion 612 may be the same as the diameter of the second pillar 620. At least a portion of the protruded portion 612 may be disposed in the third hole 113 of the upper plate part 110. The protruded portion 612 may include a hole. The upper end of the second pillar 620 may be disposed in the hole of the protruded portion 612.

The second piezoelectric element 610 may be contracted or expanded by a voltage applied from the substrate 800. The second piezoelectric element 610 may be contracted or expanded along an optical axis direction. The second piezoelectric element 610 may contract or expand in a lengthwise direction thereof according to a direction in which a voltage is applied. The second piezoelectric element 610 may generate vibration by contracting or expanding.

The second piezo motor 600 may include a second pillar 620. The second pillar 620 may be extended from the second piezoelectric element 610 in an optical axis direction. The second pillar 620 may be disposed in the second lens barrel 500. The second pillar 620 may be disposed in the second guide unit 520. The second pillar 620 may be coupled to the second guide unit 520 by a second elastic member 540. The second pillar 620 may be disposed between a third region and a sixth region of the second elastic member 540. The second pillar 620 may be fixed to the second guide unit 520 by the elastic force of the second elastic member 540.

The second pillar 620 may transmit the vibration generated from the second piezoelectric element 610 to the second lens barrel 500. At this time, the second lens barrel 500 may be moved upward or downward according to the vibration direction of the second pillar 520. Through this, the third lens 530 in the second lens barrel 500 is moved together, and a zooming function of zooming up or zooming out may be performed. The second pillar 620 may be contracted or expanded by vibration generated from the second piezoelectric element 610. The second pillar 620 may transmit vibration in an upper direction or a lower direction depending on a direction in which a voltage is applied.

The second pillar 620 may include a third buffer member 621. The third buffer member 621 may be disposed in the second pillar 620. The second buffer member 621 may be coupled to an upper portion of the second pillar 620. The third buffer member 621 may be disposed in the third hole 113 of the upper plate part 110. The second pillar 620 may include a fourth buffer member 622. The fourth buffer member 622 may be disposed in the second pillar 620. The fourth buffer member 622 may be coupled to a lower portion of the second pillar 620. The fourth buffer member 622 may be disposed below the third buffer member 621. The fourth buffer member 622 may be spaced apart from the third buffer member 621 in an optical axis direction. The third and fourth buffer members 621 and 622 may prevent noise caused by vibration of the second pillar 620. The third and fourth buffer members 621 and 622 may prevent the second pillar 620 from being deformed or destroyed by an external impact.

The camera module 10 may include a second sensor assembly 700. The second sensor assembly 700 may include a magnetoresistive sensor (MR sensor). The second sensor assembly 700 may include a giant magnetoresistive sensor (GMR sensor). The second sensor assembly 700 may detect the position and movement of the third lens 530.

The second sensor assembly 700 may include a second magnetic scale 710. The second magnetic scale 710 may be disposed in the second lens barrel 500. The second magnetic scale 710 may be disposed in the second guide unit 520. The second magnetic scale 710 may be disposed on the first side surface 521 of the second guide unit 520. The second magnetic scale 710 may include a magnet. The second magnetic scale 710 may include a plurality of magnets. The second magnetic scale 710 may be disposed with N poles and S poles crossed to one another. The second magnetic scale 710 may be disposed with N poles and S poles alternately. The second magnetic scale 710 may be moved along an optical axis direction together with the second lens barrel 500.

The second sensor assembly 700 may include a second sensor 720. The second sensor 720 may be disposed in the housing 100. The second sensor 720 may be disposed in the side plate part 120 of the housing 100. The second sensor 720 may face the second magnetic scale 710. The second sensor 720 may be disposed to be spaced apart from the second magnetic scale 710 in a direction perpendicular to an optical axis. The second sensor 720 may recognize the position of the second magnetic scale 710. Through this, the position of the second lens barrel 500 moving together with the second magnetic scale 710 may be recognized.

The camera module 10 may include a substrate 800. The substrate 800 may be disposed in the housing 100. The substrate 800 may be disposed in the side plate part 120 of the housing 100. The substrate 800 may be disposed at an outer side of the side plate part 120 of the housing 100. The substrate 800 may surround at least a portion of the side plate part 120. The substrate 800 may supply power or current to components disposed inside the housing 100. The substrate 800 may include a flexible substrate. The substrate 800 may include a flexible printed circuit board (FPCB).

The substrate 800 may include a first portion 810. The first portion 810 may be disposed above the first piezoelectric element 310 of the first piezo motor 300. The first portion 810 may be disposed above the disc part 311 of the first piezoelectric element 310 of the first piezo motor 300. The first portion 810 may be disposed above the second piezoelectric element 610 of the second piezo motor 600. The first portion 810 may be disposed above the disc part 611 of the second piezoelectric element 610 of the second piezo motor 600. The first portion 810 may not be overlapped with the second portion 820 in an optical axis direction. The substrate 800 may include a second portion 820. The second portion 820 may be disposed below the first piezoelectric element 310 of the first piezo element 300. The second portion 820 may be disposed below the disc part 311 of the first piezoelectric element 310 of the first piezo element 300. The second portion 820 may be disposed below the second piezoelectric element 610 of the second piezo element 600. The second portion 820 may be disposed below the disc part 611 of the second piezoelectric element 610 of the second piezo element 600. The second portion 820 may not overlap the first portion 810 in an optical axis direction. The substrate 800 may include a third portion facing the side plate part 120 of the housing 100. The first portion 810 may be bent from the third portion. The second portion 820 may be bent from the third portion.

The camera module 10 may include an image sensor 900. The image sensor 900 may collect light passing through the first to third lenses and convert it into an image. The image sensor 900 may be disposed so that a lens and an optical axis coincide. The optical axis of the image sensor 900 and the optical axis of the lens may be aligned.

The camera module 10 may include a first lens 130, a second lens 230, and a third lens 530. The first lens 130 may include a plurality of lenses. The first lens 130 may be disposed in the housing 100. The first lens 130 may be disposed in the upper plate part 110 of the housing 100. The first lens 130 may be disposed in the first hole 111 of the upper plate part 110 of the housing 100. The first lens 130 may be thread-coupled to the first hole 111 of the upper plate part 110 of the housing 100. The first lens 130 may include a plurality of lenses. The first lens 130 may be fixed.

The second lens 230 may be disposed in the housing 100. The second lens 230 may be disposed in the side plate part 120 of the housing 100. The second lens 230 may be disposed in the first barrel part 210. The second lens 230 may be disposed in the hole 211 of the first barrel part 210. The second lens 230 may be coupled to the hole 211 of the first barrel part 210. The second lens 230 may be thread-coupled to the first barrel part 210. The second lens 230 may perform a zoom function. The second lens 230 may be a zoom lens. The second lens 230 may be movable in an optical axis direction. The second lens 230 may be movable in an optical axis direction with respect to the first lens 130. The second lens 230 may be individually movable from the third lens 530. A distance that the second lens 230 can move in an optical axis direction may be greater than a distance that the third lens 530 can move in a corresponding direction.

The third lens 530 may be disposed in the housing 100. The third lens 530 may be disposed in the side plate part 120 of the housing 100. The third lens 530 may include a plurality of lenses. The third lens 530 may be disposed in the second lens barrel 500. The third lens 530 may be disposed in the second barrel part 510 of the second lens barrel 500. The third lens 530 may be disposed in the hole 511 of the second barrel part 510 of the second lens barrel 500. The third lens 530 may be coupled to the hole 511 of the second barrel part 510. The third lens 530 may be thread-coupled to the second barrel part 510. The third lens 530 may perform an auto focus function. The third lens 530 may be a focusing lens. The third lens 530 may be movable in an optical axis direction. The third lens 530 may be movable in an optical axis direction against the first lens 130. The third lens 530 may be individually movable against the second lens 230. The distance that the third lens 530 can move in an optical axis direction may be greater than the distance that the second lens 230 can move in a corresponding direction.

As described above, a camera module according to a first embodiment of the present invention has been described with reference to FIGS. 1 to 10. Hereinafter, a lens driving device according to a second embodiment of the present invention will be described with reference to FIGS. 11 to 18. The detailed description of a lens driving device according to a second embodiment of the present invention is based on the detailed description of each embodiment, and the camera module and the names, terms, and functions according to a first embodiment of the present invention are the same as each other or may be different.

Hereinafter, a configuration of a lens driving device according to a second embodiment of the present invention will be described with reference to the drawings.

Figure 11:
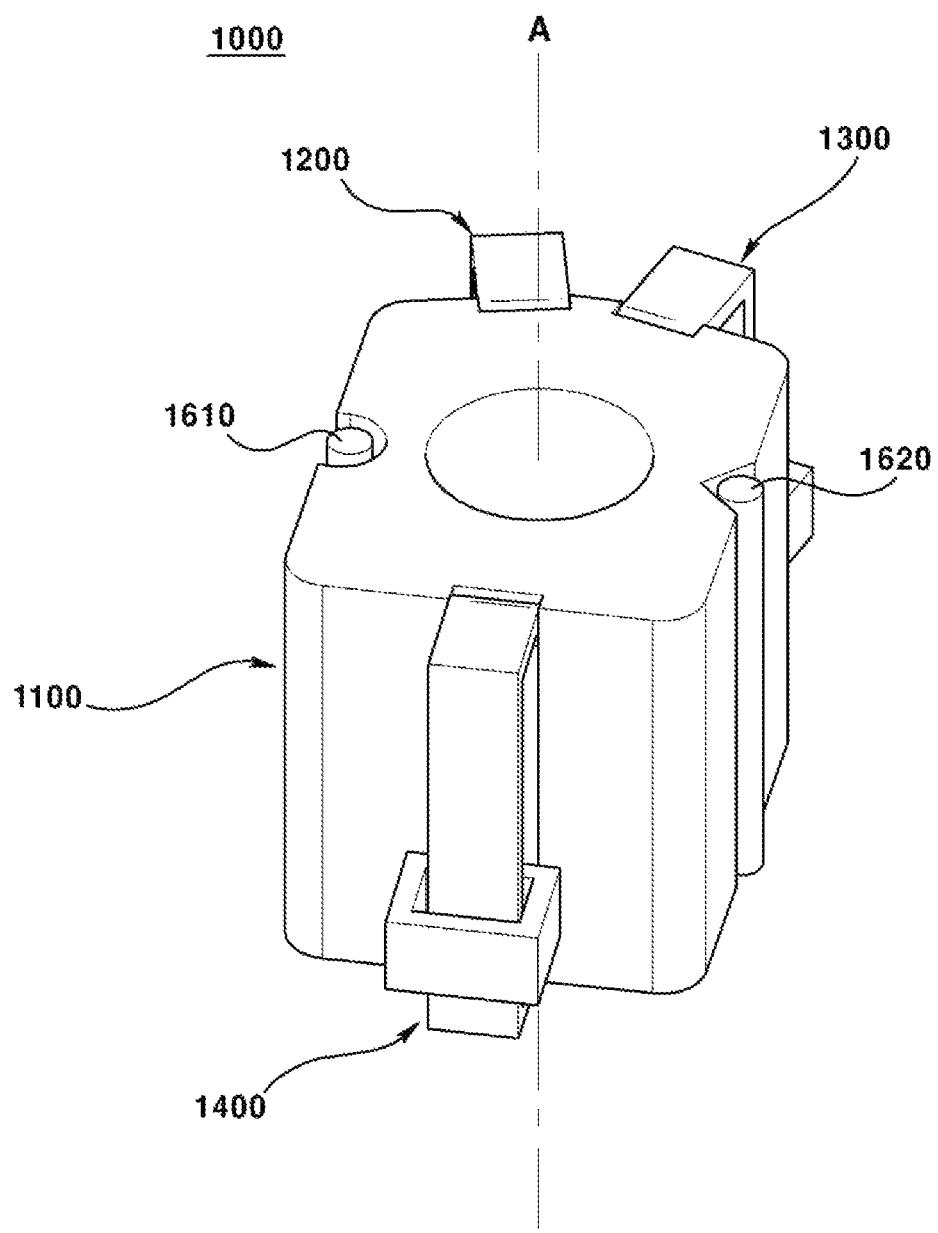
FIG. 11 is a perspective view of a partial configuration of a lens driving device according to a second embodiment of the present invention.
Figure 12:
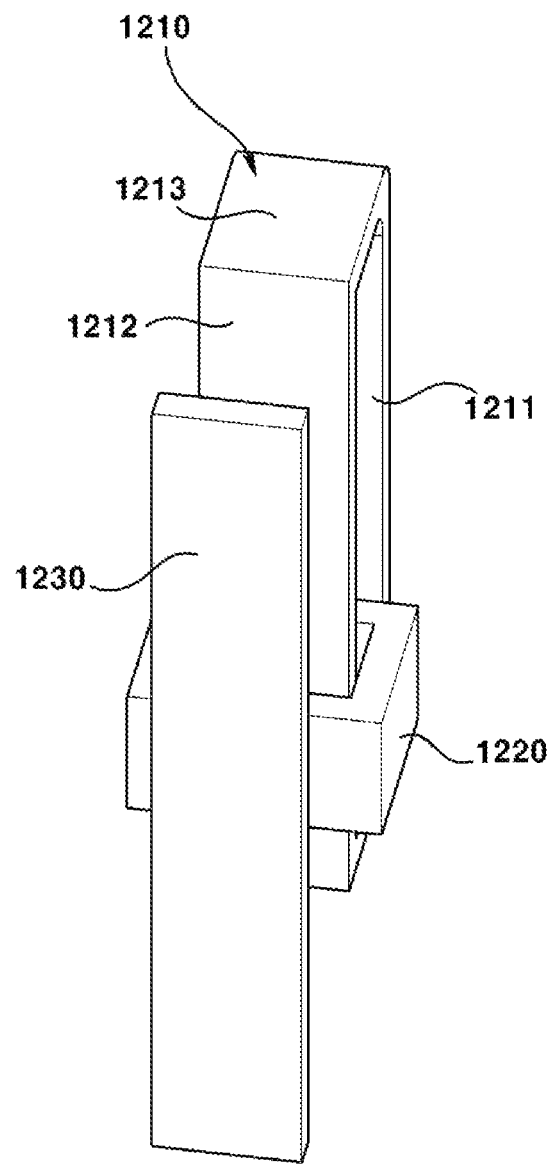
FIG. 12 is a perspective view of a partial configuration of a lens driving device according to a second embodiment of the present invention.
Figure 13:
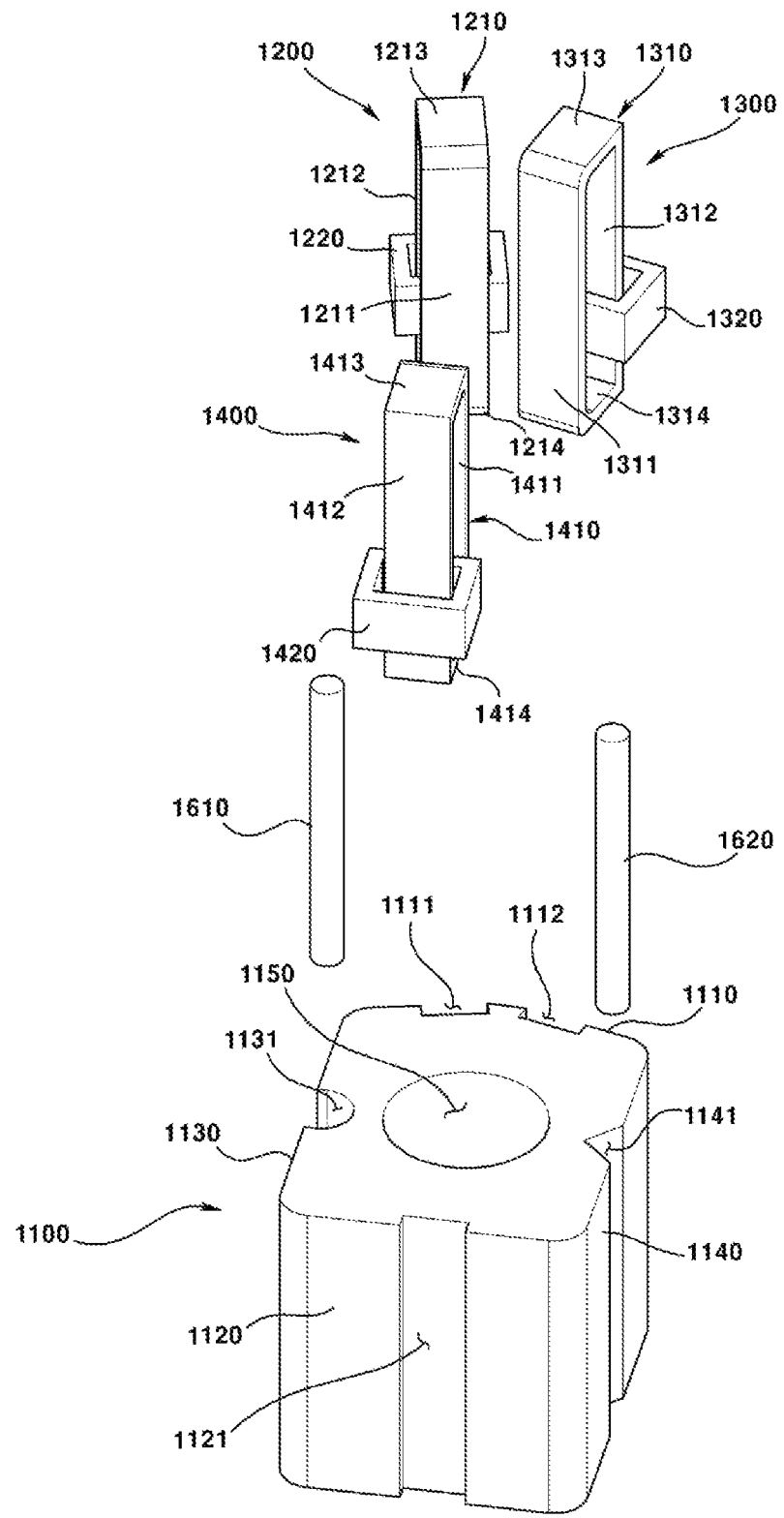
FIG. 13 is an exploded perspective view of a partial configuration of a lens driving device according to a second embodiment of the present invention.
Figure 14:
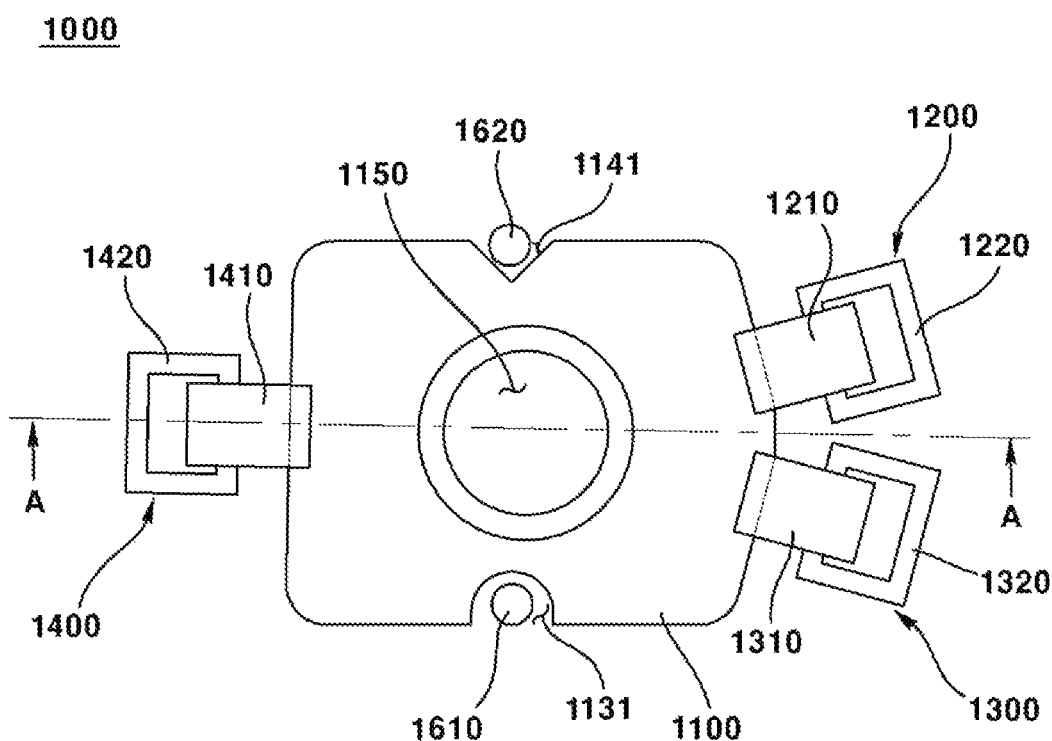
FIG. 14 is a cross-partial view of a partial configuration of a lens driving device according to a second embodiment of the present invention.
Figure 15:
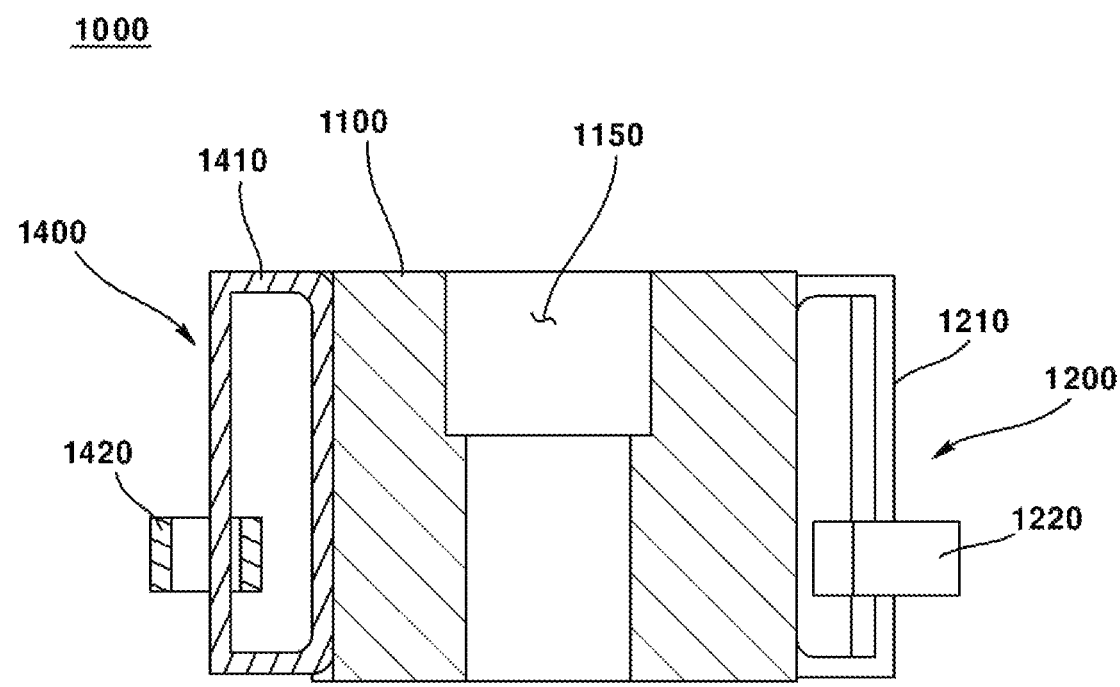
FIG. 15 is a cross-partial view taken along line A-A of FIG. 14.
Figure 16:
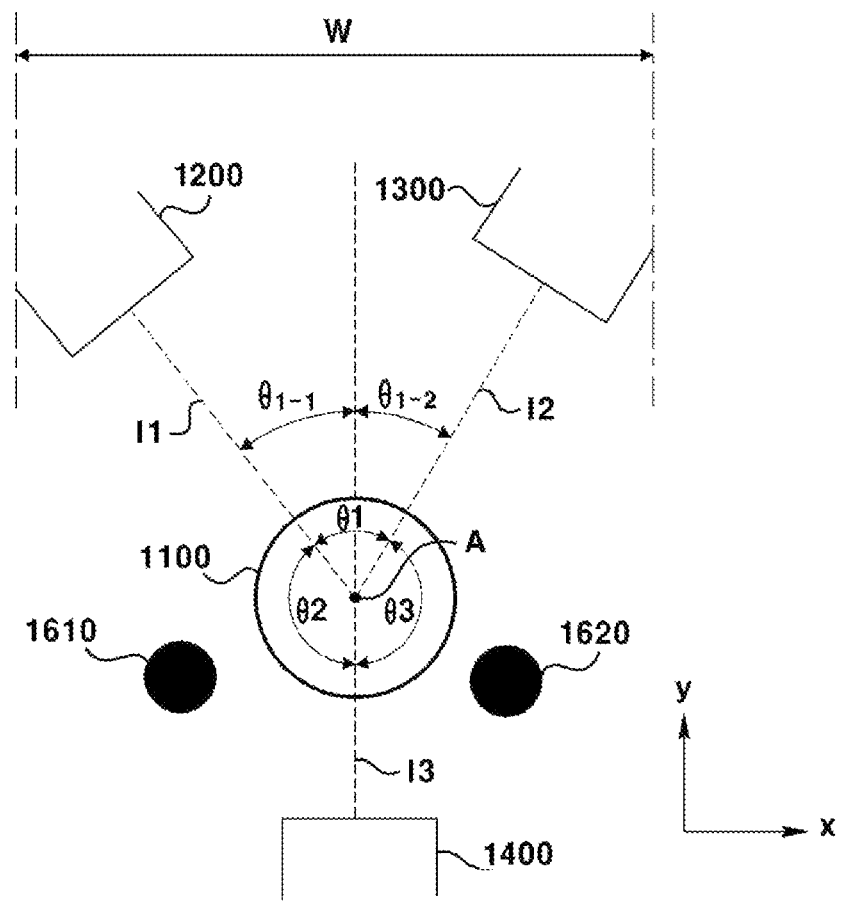
FIG. 16 is a conceptual diagram of a lens driving device according to a second embodiment of the present invention.

FIG. 11 is a perspective view of a partial configuration of a lens driving device according to a second embodiment of the present invention, FIG. 12 is a perspective view of a partial configuration of a lens driving device according to a second embodiment of the present invention, FIG. 13 is an exploded perspective view of a partial configuration of a lens driving device according to a second embodiment of the present invention, FIG. 14 is a cross-partial view of a partial configuration of a lens driving device according to a second embodiment of the present invention, FIG. 15 is a cross-partial view taken along line A-A of FIG. 14, and FIG. 16 is a conceptual diagram of a lens driving device according to a second embodiment of the present invention.

The lens driving device 1000 may be a voice coil motor (VCM). The lens driving device 1000 may be a lens driving motor. The lens driving device 1000 may be a lens driving motor. The lens driving device 1000 may be a lens driving actuator. In the present embodiment, the lens driving device 1000 may include a CLAF actuator or a CLAF module. For example, a state in which a lens, an image sensor, and a printed circuit board are assembled to the lens driving device 1000 may be understood as a camera module.

The lens driving device 1000 may include a lens barrel 1100. The first driving unit 1200 may be disposed on an outer circumferential surface of the lens barrel 1100. A second driving unit 1300 may be disposed on an outer circumferential surface of the lens barrel 1100. The second driving unit 1300 may be disposed to be spaced apart from the first driving unit 1200. A third driving unit 1400 may be disposed on an outer circumferential surface of the lens barrel 1100. The third driving unit 1400 may be disposed to be spaced apart from the first driving unit 1200. The third driving unit 1400 may be disposed to be spaced apart from the second driving unit 1300.

The lens barrel 1100 may include first to fourth side surfaces 1110, 1120, 1130, and 1140. The first to fourth side surfaces 1110, 1120, 1130, and 1140 may form an outer circumferential surface of the lens barrel 1100. The lens barrel 1100 may include: a first side surface 1110; a second side surface 1120 facing the first side surface 1110; a third side surface 1130 disposed opposite to each other between a first side surface 1100 and a second side surface 1120; and a fourth side surface 1140. The first driving unit 1200 and the second driving unit 1200 may be disposed on the first side surface 1110 to be spaced apart from each other. A third driving unit 1400 may be disposed on the second side surface 1120. The third side surface 1130 may connect the first side surface 1110 and the second side surface 1120. The fourth side surface 1140 may connect the first side surface 1110 and the second side surface 1120.

The lens barrel 1100 may include grooves 1111, 1112, and 1121. The grooves 1111, 1112, and 1121 may be formed on an outer circumferential surface of the lens barrel 1100. The grooves 1111, 1112, and 1121 may be formed by being recessed from an outer circumference of the lens barrel 1100. The grooves 1111, 1112, and 1121 may be formed to be extended from an upper surface to a lower surface of the lens barrel 1100. The grooves 1111, 1112, and 1121 may include a plurality of grooves 1111, 1112, and 1121. The first to third driving units 1200, 1300, and 1400 may be respectively disposed in the grooves 1111, 1112, and 1121. The grooves 1111, 1112, and 1121 may include: a first groove 1111 in which the first driving unit 1200 is disposed; a second groove 1112 in which a second driving unit 1300 is disposed; and a third groove 1121 in which the third driving unit 1400 is disposed. The grooves 1111, 1112, and 1121 may be grooves for accommodating the driving units.

The first groove 1111 may be formed in the first side surface 1110 of the lens barrel 1100. The first groove 1111 may be formed by being recessed from the first side surface 1110 of the lens barrel 1100. The first groove 1111 may be spaced apart from the second groove 1112. The first groove 1111 may be disposed closer to the third side surface 1130 than the fourth side surface 1140 of the lens barrel 1100. A first driving unit 1200 may be disposed in the first groove 1111. The first yoke 1210 of the first driving unit 1200 may be disposed in the first groove 1111. A first side plate 1211 of the first yoke 1210 may be disposed in the first groove 1111.

The second groove 1112 may be formed in the first side surface 1110 of the lens barrel 1100. The second groove 1112 may be formed by being recessed from the first side surface 1110 of the lens barrel 1100. The second groove 1112 may be spaced apart from the first groove 1111. The second groove 1112 may be disposed closer to the fourth side surface 1140 than the third side surface 1130 of the lens barrel 1100. A second yoke 1310 may be disposed in the second groove 1112. A second driving unit 1300 may be disposed in the second groove 1112. A second yoke 1310 of the second driving unit 1300 may be disposed in the second groove 1112. A first side plate 1311 of the second yoke 1310 may be disposed in the second groove 1112.

The third groove 1121 may be formed in the second side surface 1120 of the lens barrel 1100. The third groove 1121 may be formed by being recessed from the second side surface 1120 of the lens barrel 1100. A third yoke 1410 may be disposed in the third groove 1121. A first side plate 1411 of the third yoke 1410 may be disposed in the third groove 1121.

The lens barrel 1100 may include grooves 1131 and 1141. The grooves 1131 and 1141 may be formed on an outer circumferential surface of the lens barrel 1100. The grooves 1131 and 1141 may be formed by being recessed from an outer circumference of the lens barrel 1100. The grooves 1131 and 1141 may be formed to be extended from an upper surface to the lower surface of the lens barrel 1100. The grooves 1131 and 1141 may include a plurality of grooves 1131 and 1141. First and second pins 1610 and 1620 may be respectively disposed in the grooves 1131 and 1141. The grooves 1131 and 1141 may include a first groove 1131 in which the first pin 1610 is disposed and a second groove 1141 in which the second pin 1620 is disposed. The grooves 1131 and 1141 may be the grooves for accommodating the guide pins.

The first groove 1131 may be formed in the third side surface 1130 of the lens barrel 1100. The first groove 1131 may be formed by being recessed from the third side surface 1130 of the lens barrel 1100. The first groove 1131 may be formed in a shape different from that of the second groove 1141. The first groove 1131 may include a curved surface. The first groove 1131 may be formed in a round shape. The first groove 1131 may be formed in a 'U' shape. The first groove 1131 may have a semicircular cross-part.

The first groove 1131 may be formed in a central portion of the third side surface 1130. As a modified embodiment, the first groove 1131 may be formed closer to the second side surface 1120 than a virtual line connecting an optical axis A and the center of the third side surface 1130. As a modified embodiment, the first groove 1131 may be formed closer to the second side surface 1120 than the first side surface 1110.

A first pin 1610 may be disposed in the first groove 1131. The first pin 1610 may be movably disposed in the first groove 1131. The first pin 1610 may be disposed in the first groove 1131 to be movable in the optical axis A direction. The first groove 1131 may restrict movement of the first pin 1610 in a first direction perpendicular to the optical axis A. An inner surface of the first groove 1131 may be in contact with the first pin 1610. At least a portion of an inner surface of the first groove 1131 may be in contact with the first pin 1610. At least a portion of the curved surface of the first groove 1131 may be in contact with the first pin 1610.

The second groove 1141 may be formed in the fourth side surface 1140 of the lens barrel 1100. The second groove 1141 may be formed by being recessed from the fourth side surface 1140 of the lens barrel 1100. The second groove 1141 may be formed in a shape different from that of the first groove 1131. The second groove 1141 may include two inclined surfaces. The second groove 1141 may be formed in a 'V' shape.

The second groove 1141 may be formed in a central portion of the fourth side surface 1140. As a modified embodiment, the second groove 1141 may be formed closer to the second side surface 1120 than a virtual line connecting the optical axis A and the center of the fourth side surface 1140. As a modified embodiment, the second groove 1141 may be formed closer to the second side surface 1120 than the first side surface 1110.

A second pin 1620 of the lens barrel 1100 may be disposed in the second groove 1141. A second pin 1620 may be movably disposed in the second groove 1141. A second pin 1620 may be disposed in the second groove 1141 to be movable in the optical axis A direction. The second groove 1141 may restrict movement of the second pin 1620 in a second direction perpendicular to the optical axis A and the first direction. An inner surface of the second groove 1141 may be in contact with the second pin 1620. At least a portion of an inner surface of the second groove 1141 may be in contact with the second pin 1620. At least a portion of an inclined surface of the second groove 1141 may be in contact with the second pin 1620. At least one inclined surface of the two inclined surfaces of the second groove 1141 may be in contact with the second pin 1620.

The lens barrel 1100 may include a hole 1150. The hole 1150 may be a hollow hole. A lens may be coupled to the hole 1150. The hole 1150 may be formed penetrating through the center of the lens barrel 1100 in the optical axis A direction. The hole 1150 may include a first hole and a second hole being extended downward from the first hole. The length of the first hole in a direction perpendicular to the optical axis A may be greater than the length of the second hole in a corresponding direction.

The lens driving device 1000 may include a first driving unit 1200. The first driving unit 1200 may be disposed on an outer circumferential surface of the lens barrel 1100. The first driving unit 1200 may be disposed on the first side surface 1110 of the lens barrel 1100. The first driving unit 1200 may be spaced apart from the second driving unit 1300. The first driving unit 1200 includes a first virtual straight line I1 connecting the second driving unit 1300, the optical axis A, and the first driving unit 1200, and the optical axis A and the second driving unit 1300 may be spaced apart at a first angle θ1 formed by a second virtual straight line I2 connecting them. At this time, the first straight line I1 is a virtual straight line connecting the optical axis A and the center of the first driving unit 1200, and the second straight line I2 may be a virtual straight line connecting the optical axis A and the center of the second driving unit 1300.

The first driving unit 1200 may include a first yoke 1210. The first yoke 1210 may be disposed in the lens barrel 1100. The first yoke 1210 may be disposed on the first side surface 1110 of the lens barrel 1100. A first coil 1220 may be disposed in the first yoke 1210. The first yoke 1210 may face the first magnet 1230. The first yoke 1210 may include a hole. The hole of the first yoke 1210 may accommodate at least a portion of the first coil 1220.

The first yoke 1210 may include: a first side plate 1211; a second side plate 1212 facing the first side plate 1211; an upper plate 1213 and a lower plate 1214 connecting the first side plate 1211 and the second side plate 1212. The first side plate 1211 may be disposed on the first side surface 1110 of the lens barrel 1100. The first side plate 1211 may be disposed in the first groove 1111 of the first side surface 1110 of the lens barrel 1100. The first side plate 1211 may be formed in a shape corresponding to the first groove 1111 of the first side surface 1110 of the lens barrel 1100. The first side plate 1211 may be formed in a flat plate shape. The first side plate 1211 may be formed in a rectangular parallelepiped shape. An upper end of the first side plate 1211 may be connected to an upper plate 1213 and a lower end may be connected to the lower plate 1214.

The second side plate 1212 may face the first side plate 1211. The second side plate 1212 may be disposed opposite to the first side plate 1211. The second side plate 1212 may be formed in a shape corresponding to the first side plate 1211. The second side plate 1212 may be formed in a flat plate shape. The second side plate 1212 may be formed in a rectangular parallelepiped shape. An upper end of the second side plate 1212 may be connected to an upper end of the first side plate 1211 through the upper plate 1213. A lower end of the second side plate 1212 may be connected to a lower end of the first side plate 1211 through the lower plate 1214. A first coil 1220 may be disposed in the second side plate 1212. The first coil 1220 may be wound around the second side plate 1212. A first coil 1220 may be wound around the outer circumference of the second side plate 1212.

The upper plate 1213 may connect the upper end of the first side plate 1211 of the first yoke 1210 and the upper end of the second side plate 1212 of the first yoke 1210. At least a portion of the upper plate 1213 may be overlapped with the first coil 1220 in the optical axis A direction. The upper plate 1213 may be formed in a flat plate shape. The lower plate 1214 may connect the lower end of the first side plate 1211 of the first yoke 1210 and the lower end of the second side plate 1212 of the first yoke 1210. At least a portion of the lower plate 1214 may be overlapped with the first coil 1220 in the optical axis A direction. The lower plate 1214 may be formed in a flat plate shape.

The first driving unit 1200 may include a first coil 1220. The first coil 1220 may be disposed in the first yoke 1210. The first coil 1220 may be disposed in the second side plate 1212 of the first yoke 1210. The first coil 1220 may be wound around the second side plate 1212 of the first yoke 1210. At least a portion of the first coil 1220 may be disposed being in contact with the second side plate 1212 of the first yoke 1210. The first coil 1220 may include: a first portion disposed between the first side plate 1211 and the second side plate 1212 of the first yoke 1210; a second portion facing the first portion and disposed at an outer side of the second side plate 1212 of the first yoke 1210; and a third part and a fourth part connecting the first part and the second part.

At least a portion of the first portion of the first coil 1220 may be overlapped with the upper plate 1213 of the first yoke 1210 in the optical axis A direction. The first coil 1220 may be disposed closer to the lower plate 1214 than the upper plate 1213 of the first yoke 1210. The first coil 1220 may be directly wound on the second side plate 1212 of the first yoke 1210. The first coil 1220 may face the first magnet 1230. The first coil 1220 may electromagnetically interact with the first magnet 1230. When electromagnetic field is formed around the first coil 1220 as a current is supplied to the first coil 1220, the first coil 1220 may move against the first magnet 1230 due to the electromagnetic interaction between the first coil 1220 and the first magnet 1230.

The first driving unit 1200 may include a first magnet 1230. The first magnet 1230 may face the first coil 1220. The first magnet 1230 may face the second portion of the first coil 1220. The first magnet 1230 may electromagnetically interact with the first coil 1220. The first magnet 1230 may be used for zoom driving. The first magnet 1230 may be formed of a flat magnet. The first magnet 1230 may be formed in a flat plate shape. The first magnet 1230 may be formed in a rectangular parallelepiped shape. The first magnet 1230 may be formed to be longer than the length of the second side plate 1212 in the optical axis A direction.

The lens driving device 1000 may include a second driving unit 1300. The second driving unit 1300 may be disposed on an outer circumferential surface of the lens barrel 1100. The second driving unit 1300 may be disposed on the first side surface 1110 of the lens barrel 1100. The second driving unit 1300 may be disposed to be spaced apart from the first driving unit 1200.

The second driving unit 1300 may include a second yoke 1310. The second yoke 1310 may be disposed in the lens barrel 1100. The second yoke 1310 may be disposed on the first side surface 1110 of the lens barrel 1100. A second coil 1230 may be disposed in the second yoke 1310. The second yoke 1310 may face a second magnet (not shown). The second yoke 1310 may include a hole. The hole of the second yoke 1310 may accommodate at least a portion of the second coil 1320.

The second yoke 1310 may include: a first side plate 1311; a second side plate 1312 facing the first side plate 1311; and an upper plate 1313 and a lower plate 1314 connecting the first side plate 1311 and the second side plate 1312. The first side plate 1311 may be disposed on the first side surface 1110 of the lens barrel 1100. The first side plate 1311 may be disposed in the second groove 1112 of the first side surface 1110 of the lens barrel 1100. The first side plate 1311 may be formed in a shape corresponding to the second groove 1112 of the first side surface 1110 of the lens barrel 1100. The first side plate 1311 may be formed in a flat plate shape. The first side plate 1311 may be formed in a rectangular parallelepiped shape. An upper end of the first side plate 1311 is connected to the upper plate 1313 and a lower end thereof may be connected to the lower plate 1314.

The second side plate 1311 may face the first side plate 1312. The second side plate 1311 may be disposed opposite to the first side plate 1311. The second side plate 1312 may be formed in a shape corresponding to the first side plate 1311. The second side plate 1312 may be formed in a flat plate shape. The second side plate 1312 may be formed in a rectangular parallelepiped shape. An upper end of the second side plate 1312 may be connected to an upper end of the first side plate 1311 through the upper plate 1313. A lower end of the second side plate 1312 may be connected to a lower end of the second side plate 1312 through the lower plate 1314. A second coil 1320 may be disposed in the second side plate 1312. The second coil 1320 may be wound around the second side plate 1312. The second coil 1320 may be wound around the outer circumference of the second side plate 1312.

The upper plate 1313 may connect an upper end of the first side plate 1311 of the second yoke 1310 and the upper end of the second side plate 1312 of the second yoke 1310. At least a portion of the upper plate 1313 may be overlapped with the second coil 1320 in the optical axis A direction. The upper plate 1313 may be formed in a flat plate shape. The lower plate 1314 may connect a lower end of the first side plate 1311 of the second yoke 1310 and a lower end of the second side plate 1312 of the second yoke 1310. At least a portion of the lower plate 1314 may be overlapped with the second coil 1320 in the optical axis A direction. The lower plate 1314 may be formed in a flat plate shape.

The second driving unit 1300 may include a second coil 1320. The second coil 1320 may be disposed in the second yoke 1310. The second coil 1320 may be disposed in the second side plate 1312 of the second yoke 1310. The second coil 1320 may be wound around the second side plate 1312 of the second yoke 1310. At least a portion of the second coil 1320 may be disposed being in contact with the second side plate 1312 of the second yoke 1310. The second coil 1320 may include: a first portion disposed between the first side plate 1311 and the second side plate 1312 of the second yoke 1310; a second portion facing the first portion and disposed at an outer side of the second side plate 1312 of the second yoke 1310; and a third portion and a fourth portion connecting the first part and the second part. At least a portion of the first portion of the second coil 1320 may be overlapped with the upper plate 1313 of the second yoke 1310 in the optical axis A direction. The second coil 1320 may be disposed closer to the lower plate 1314 than the upper plate 1313 of the second yoke 1310. The second coil 1320 may be directly wound on the second side plate 1312 of the second yoke 1310. The second coil 1320 may face the second magnet. The second coil 1320 may electromagnetically interact with the second magnet. When a current is supplied to the second coil 1320 to form an electromagnetic field around the second coil 1320, the second coil 1320 may move against the second magnet due to the electromagnetic interaction between the second coil 1320 and the second magnet.

The second driving unit 1300 may include a second magnet. The second magnet may face the second coil 1320. The second magnet may face a second portion of the second coil 1320. The second magnet may electromagnetically interact with the second coil 1320. The second magnet may be used for zoom driving. The second magnet may be formed of a flat magnet. The second magnet may be formed in a flat plate shape. The second magnet may be formed in a rectangular parallelepiped shape. The second magnet may be formed to be longer than the length of the second side plate 1312 in the optical axis A direction.

The lens driving device 1000 may include a third driving unit 1400. The third driving unit 1400 may be disposed on an outer circumferential surface of the lens barrel 1100. The third driving unit 1400 may be disposed on the second side surface 1120 of the lens barrel 1100. The third driving unit 1400 may be disposed to be spaced apart from the first driving unit 1200. The third driving unit 1400 may be spaced apart at a second angle θ2 formed by: a virtual third straight line I3 connecting the first driving unit 1200, the optical axis A, and the third driving unit 1400; and a virtual first straight line I1 connecting the optical axis A, and the first driving unit 1200. At this time, the first straight line I1 is a virtual straight line connecting the optical axis A and the center of the first driving unit 1200, and the third straight line I3 may be a virtual straight line connecting the optical axis A and the center of the third driving unit 1400.

The third driving unit 1400 may be disposed to be spaced apart from the second driving unit 1300. The third driving unit 1400 may be spaced apart at a third angle θ3 formed by: a virtual third straight line I3 connecting the second driving unit 1300, the optical axis A, and the third driving unit 1400; and a second virtual straight line I2 connecting the optical axis A and the second driving unit 1300. At this time, the second straight line I2 is a virtual straight line connecting the optical axis A and the center of the second driving unit 1300, and the third straight line I3 may be a virtual straight line connecting the optical axis A and the center of the third driving unit 1400.

The third driving unit 1400 may include a third yoke 1410. The third yoke 1410 may be disposed in the lens barrel 1100. The third yoke 1410 may be disposed on the second side surface 1120 of the lens barrel 1100. A third coil 1320 may be disposed in the third yoke 1410. The third yoke 1410 may face a third magnet (not shown). The third yoke 1410 may include a hole. The hole of the third yoke 1410 may accommodate at least a portion of the third coil 1420.

The third yoke 1410 may include: a first side plate 1411; a second side plate 1412 facing the first side plate 1411; and an upper plate 1413 and a lower plate 1414 connecting the first side plate 1411 and the second side plate 1412. The first side plate 1411 may be disposed on the second side surface 1120 of the lens barrel 1100. The first side plate 1411 may be disposed in the third groove 1121 of the second side surface 1120 of the lens barrel 1100. The first side plate 1411 may be formed in a shape corresponding to the third groove 1121 of the second side surface 1120 of the lens barrel 1100. The first side plate 1411 may be formed in a flat plate shape. The first side plate 1411 may be formed in a rectangular parallelepiped shape. An upper end of the first side plate 1411 may be connected to an upper plate 1413 and a lower end may be connected to the lower plate 1414.

The second side plate 1412 may face the first side plate 1411. The second side plate 1412 may be disposed opposite to the first side plate 1411. The second side plate 1412 may be formed in a shape corresponding to the first side plate 1411. The second side plate 1412 may be formed in a flat plate shape. The second side plate 1412 may be formed in a rectangular parallelepiped shape. An upper end of the second side plate 1412 may be connected to an upper end of the first side plate 1411 through the upper plate 1413. A lower end of the second side plate 1412 may be connected to a lower end of the first side plate 1411 through the lower plate 1414. A third coil 1420 may be disposed in the second side plate 1412. The third coil 1420 may be wound around the second side plate 1412. The third coil 1420 may be wound around the outer circumference of the second side plate 1412.

The upper plate 1413 may connect an upper end of the first side plate 1411 of the third yoke 1410 and an upper end of the second side plate 1412 of the third yoke 1410. At least a portion of the upper plate 1413 may be overlapped with the third coil 1420 in the optical axis A direction. The upper plate 1413 may be formed in a flat plate shape. The lower plate 1414 may connect a lower end of the first side plate 1411 of the third yoke 1410 and a lower end of the second side plate 1412 of the third yoke 1410. At least a portion of the lower plate 1414 may be overlapped with the third coil 1420 in the optical axis A direction. The lower plate 1414 may be formed in a flat plate shape.

The third driving unit 1400 may include a third coil 1420. The third coil 1420 may be disposed in the third yoke 1410. The third coil 1420 may be disposed in the second side plate 1412 of the third yoke 1410. The third coil 1420 may be wound around the second side plate 1412 of the third yoke 1410. At least a portion of the third coil 1420 may be disposed being in contact with the second side plate 1412 of the third yoke 1410. The third coil 1420 may include: a first portion disposed between the first side plate 1411 and the second side plate 1412 of the third yoke 1410; a second portion facing the first portion and disposed at an outer side of the second side plate 1412 of the third yoke 1410; and a third portion and a fourth portion connecting the first portion and the second portion. At least a portion of the first portion of the third coil 1420 may be overlapped with the upper plate 1413 of the third yoke 1410 in the optical axis A direction. The third coil 1420 may be disposed closer to the lower plate 1414 than the upper plate 1413 of the third yoke 1410. The third coil 1420 may be directly wound on the second side plate 1412 of the third yoke 1410. The fourth coil 1420 may face the third magnet. The third coil 1420 may electromagnetically interact with the fourth magnet. When a current is supplied to the third coil 1420 to form an electromagnetic field around the third coil 1420, the third coil 1420 may move against the third magnet due to the electromagnetic interaction between the third coil 1420 and the third magnet.

The third driving unit 1400 may include a third magnet. The third magnet may face the third coil 1420. The third magnet may face the second portion of the third coil 1420. The third magnet may electromagnetically interact with the third coil 1420. The third magnet may be used for zoom driving. The third magnet may be formed of a flat magnet. The third magnet may be formed in a flat plate shape. The third magnet may be formed in a rectangular parallelepiped shape. The third magnet may be formed to be longer than the length of the second side plate 1412 in the optical axis A direction.

The first virtual straight line I1 connecting the optical axis A and the first driving unit 1200 and the second virtual straight line I2 connecting the optical axis A and the second driving unit 1300 may form a first angle θ1. At this time, the first straight line I1 is a virtual straight line connecting the optical axis A and the center of the first driving unit 1200, and the second straight line I2 is a virtual straight line connecting the optical axis A and the center of the second driving unit 1300. The third virtual straight line I3, the first straight line I1 connecting the optical axis A, and the third driving unit 1400 may form a second angle θ2. At this time, the third straight line I3 may be a virtual straight line connecting the optical axis A and the center of the third driving unit 1400. The second straight line I2 and the third straight line I3 may form a third angle θ3.

The first angle θ1 may be smaller than the second angle θ2. The first angle θ1 may be smaller than the third angle θ3. The second angle θ2 may be the same as the third angle θ3. The second angle θ2 may be greater than 120° and smaller than 180°. The third angle θ3 may be greater than 120° and smaller than 180°. Through this, even if the number of driving units is increased, the thickness of the lens driving device 1000 can be minimized. The first angle θ1 may be smaller than 120°. Through this, even if the number of driving units is increased, the thickness of the lens driving device 1100 can be minimized. Through this, the thickness of the entire portable terminal including the lens driving device 1000 can be reduced. In addition, when the camera including the lens driving device 1000 is the front camera of the mobile terminal, it is possible to prevent the camera from being protruded from the front display of the mobile terminal. When the camera including the lens driving device 1000 is the rear camera of the mobile terminal, it is possible to prevent the camera from being protruded outward from the rear surface of the housing that forms the outer appearance of the mobile terminal.

Specifically, a straight line connecting the first driving unit 1200 and the second driving unit 1300 by the shortest distance may be perpendicular to the optical axis A direction. A straight line connecting the center of the first driving unit 1200 and the center of the second driving unit 1300 by the shortest distance may be perpendicular to the optical axis A direction. A straight line connecting the first driving unit 1200 and the second driving unit 1300 by the shortest distance may be substantially orthogonal to the front display of the portable terminal on which the lens driving device 1000 is mounted.

In more detail, the thickness of the lens driving device 1000 may be determined by the distance between the first driving unit 1200 and the second driving unit 1300. At this time, the straight line W connecting the first driving unit 1200 and the second driving unit 1300 by the maximum distance may be the thickness of the lens driving device 1000. The straight line W connecting the first driving unit 1200 and the second driving unit 1300 by the maximum distance may be reduced by the first angle θ1. In more detail, the straight line W connecting the first driving unit 1200 and the second driving unit 1300 by the maximum distance may decrease as the first angle θ1 decreases. In this case, the thickness of the lens driving device 1000 may be reduced. The angle θ1-1 formed by the third straight line I3 and the first straight line I1 and the angle θ1-2 formed by the third straight line I3 and the second straight line I2 may be the same. At this time, the angle θ1-1 formed by the third straight line I3 and the first straight line I1 may be a clockwise angle with respect to the first straight line I1. An angle θ1-2 formed by the third straight line I3 and the second straight line I2 may be an angle in a counterclockwise direction with respect to the second straight line. The angle θ1-1 formed by the third straight line I3 and the first straight line I1 and the angle θ1-2 formed by the third straight line I3 and the second straight line I2 may be smaller than 60°. Through this, even if the number of driving units is increased, the thickness of the lens driving device 1000 may be reduced. That is, as the number of driving units increases, the driving force is increased and at the same time the thickness of the lens driving device 1000 is reduced, thereby realizing miniaturization of the module.

The lens driving device 1000 may include pins 1610 and 1620. The pins 1610 and 1620 may be in contact with the lens barrel 1100. At least a portion of the pins 1610 and 1620 may be in contact with the lens barrel 1100. The pins 1610 and 1620 may be disposed in the grooves 1131 and 1141 of the lens barrel 1100. The pins 1610 and 1620 may guide the movement of the lens barrel 1100 in the optical axis A direction. Through this, it is possible to align the optical axis of the plurality of lens groups.

The pins 1610 and 1620 may include a first pin 1610. The first pin 1610 may be disposed on the third side surface 1130 of the lens barrel 1100. The first pin 1610 may be disposed in the first groove 1131 of the third side surface 1130 of the lens barrel 1100. The first pin 1610 may be movably disposed in the first groove 1131 of the third side surface 1130 of the lens barrel 1100. The first pin 1610 may be disposed so that the first pin 1610 is movable in the optical axis A direction in the first groove 1131 of the third side surface 1130 of the lens barrel 1100. At least a portion of the first pin 1610 may be in contact with at least a portion of the first groove 1131 of the third side surface 1130 of the lens barrel 1100. The first pin 1610 may be disposed in a central portion of the third side surface 1130 of the lens barrel 1100. As a modified embodiment, the first pin 1610 may be disposed closer to the third driving unit 1400 than to the first driving unit 1200. The first pin 1610 may be overlapped with the second pin 1620 in a first direction perpendicular to the optical axis A.

The pins 1610 and 1620 may include a second pin 1620. The second pin 1620 may be disposed on the fourth side surface 1140 of the lens barrel 1100. The second pin 1620 may be disposed in the second groove 1141 of the fourth side surface 1140 of the lens barrel 1100. The second pin 1620 may be movably disposed in the second groove 1141 of the fourth side surface 1140 of the lens barrel 1100. The second pin 1620 may be disposed in the second groove 1141 of the fourth side surface 1140 of the lens barrel 1100 to be movable in the optical axis A direction. At least a portion of the second pin 1620 may be in contact with at least a portion of the second groove 1141 of the fourth side surface 1140 of the lens barrel 1100. The second pin 1620 may be disposed in a central portion of the fourth side surface 1140 of the lens barrel 1100. As a modified embodiment, the second pin 1620 may be disposed closer to the third driving unit 1400 than to the second driving unit 1300. The second pin 1620 may overlap the first pin 1610 in a first direction perpendicular to the optical axis A.

Hereinafter, a configuration of a lens driving device according to another embodiment of the second embodiment of the present invention will be described with reference to the drawings.

Figure 17:
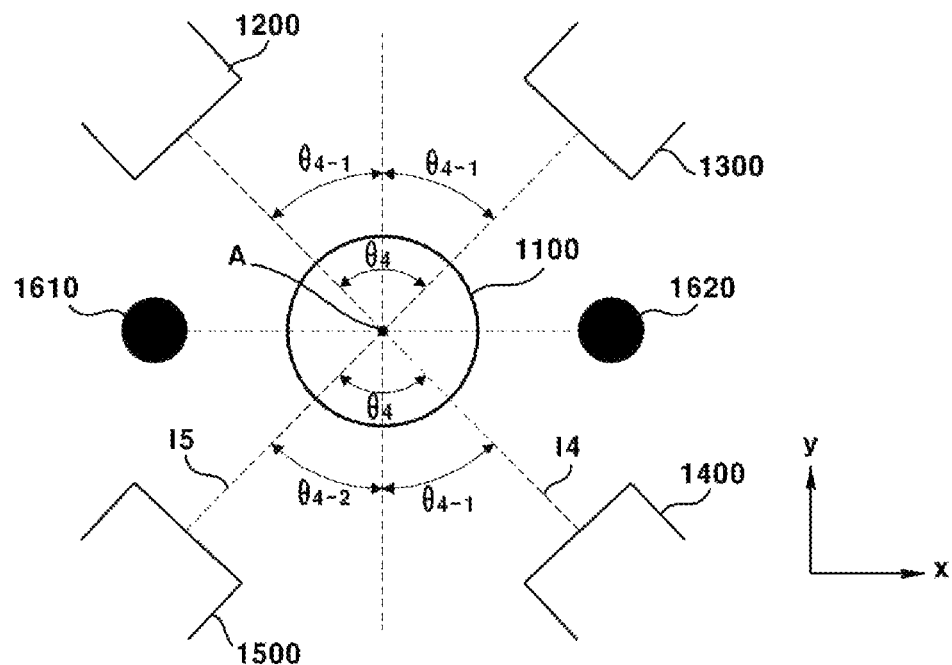
FIG. 17 is a conceptual diagram of a lens driving device according to another embodiment of a second embodiment of the present invention.

FIG. 17 is a conceptual diagram of a lens driving device according to another embodiment of a second embodiment of the present invention.

A lens driving device 1000 according to another embodiment of the second embodiment of the present invention may be interpreted as having the same configuration as the lens driving device 1000 according to a second embodiment of the present invention, except for the arrangement and number of driving units.

The lens driving device 1000 may include: a lens barrel 1100; a first driving unit 1200; a second driving unit 1300; a third driving unit 1300; a fourth driving unit 1500; a first pin 1610; and a second pin 1620.

The first driving unit 1200 may be disposed in the lens barrel 1100. The first driving unit 1200 may be disposed on a first side surface of the lens barrel 1100. The first driving unit 1200 may be spaced apart from the second driving unit 1300. The first driving unit 1200 may be disposed opposite to the third driving unit 1400 with respect to the optical axis A. The second driving unit 1300 may be disposed in the lens barrel 1100. The second driving unit 1300 may be disposed on the first side surface of the lens barrel 1100. The second driving unit 1300 may be spaced apart from the first driving unit 1200. The second driving unit 1300 may be disposed opposite to the fourth driving unit 1500 with respect to the optical axis A. The third driving unit 1400 may be disposed in the lens barrel 1100. The third driving unit 1400 may be disposed on the second side surface 1120 of the lens barrel 1100. The third driving unit 1400 may be spaced apart from the fourth driving unit 1500. The third driving unit 1400 may be disposed opposite to the first driving unit 1200 with respect to the optical axis A. The fourth driving unit 1500 may be disposed in the lens barrel 1100. The fourth driving unit 1500 may be disposed on the second side surface 1120 of the lens barrel 1100. The fourth driving unit 1500 may be spaced apart from the third driving unit 1400. The fourth driving unit 1500 may be disposed opposite to the second driving unit 1300 with respect to the optical axis A.

A virtual fourth straight line I4 connecting the optical axis A to the first and third driving units 1200 and 1400 and the optical axis A and the virtual fifth straight line I5 connecting the second and fourth driving units 1300 and 1500 may form a fourth angle θ4. At this time, the fourth straight line I4 may be a virtual straight line connecting the optical axis A and the centers of the first and third driving units 1200 and 1400. The fourth angle θ4 may be greater than 0° and smaller than 90°. The fourth angle θ4 may be a clockwise angle with respect to the fourth straight line I4. In addition, the fourth angle θ4 may be a counterclockwise angle with respect to the fifth straight line I5.

An angle θ4-1 formed by the fourth straight line I4 and the optical axis A and the virtual line passing through the centers of the first and second side surfaces 1110 and 1120 of the lens barrel 1100 is the fifth An angle θ4-2 formed by the straight line I5 and the optical axis A and the virtual line passing through the centers of the first and second side surfaces 1110 and 1120 of the lens barrel 1100 may be the same.

The lens driving device 1000 may include a first pin 1610. The first pin 1610 may be disposed in the lens barrel 1100. The first pin 1610 may be disposed on the third side surface 1130 of the lens barrel 1100. The first pin 1610 may be disposed in a central portion of the third side surface 1130 of the lens barrel 1100. The lens driving device 1000 may include a second pin 1620. The second pin 1620 may be disposed in the lens barrel 1100. The second pin 1620 may be disposed on the fourth side surface 1140 of the lens barrel 1100. The second pin 1620 may be disposed in a central portion of the fourth side surface 1140 of the lens barrel 1100.

Hereinafter, a configuration of a lens driving device according to another embodiment of a second embodiment of the present invention will be described with reference to the drawings.

Figure 18:
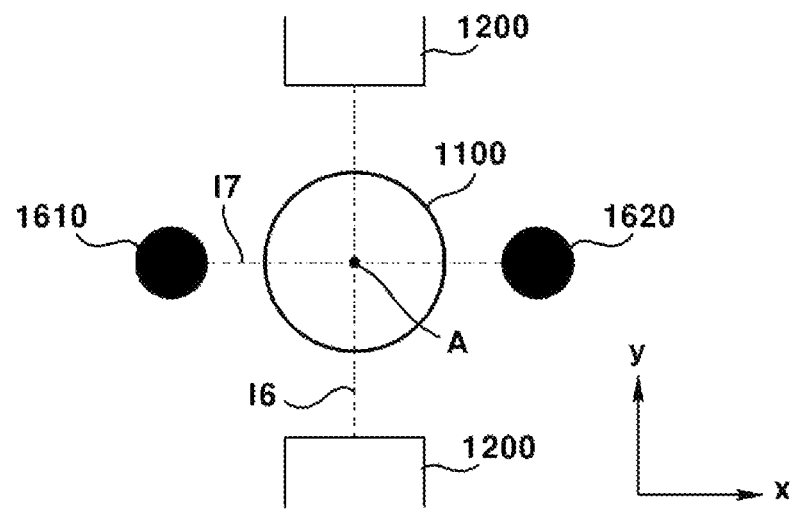
FIG. 18 is a conceptual diagram of a lens driving device according to still another embodiment of a second embodiment of the present invention.

FIG. 18 is a conceptual diagram of a lens driving device according to still another embodiment of a second embodiment of the present invention.

A lens driving device 1000 according to still another embodiment of a second embodiment of the present invention may be interpreted as having the same configuration as the lens driving device 1000 according to the second embodiment of the present invention, except for the arrangement of driving units and the number of driving units.

The lens driving device 1000 may include a lens barrel 1100, a first driving unit 1200, a second driving unit 1200, a first pin 1610, and a second pin 1620.

The first driving unit 1200 may be disposed in the lens barrel 1100. The first driving unit 1200 may be disposed on the first side surface 1110 of the lens barrel 1100. The first driving unit 1200 may be disposed in a central portion of the first side surface 1110 of the lens barrel 1100. The first driving unit 1200 may be disposed on a virtual line connecting the optical axis A and the central portion of the first side surface 1110 of the lens barrel 1100. The center of the first driving unit 1200 may be disposed on a virtual sixth straight line I6 perpendicular to the optical axis A direction. At this time, when the optical axis A is the z-axis, the sixth straight line I6 may mean the y-axis. The first driving unit 1200 may be overlapped with the second driving unit 1300 in a first direction perpendicular to the optical axis A. At this time, when the optical axis A is a z-axis, the first direction may mean a y-axis direction.

The second driving unit 1300 may be disposed in the lens barrel 1100. The second driving unit 1300 may be disposed on the second side surface 1120 of the lens barrel 1100. The second driving unit 1200 may be disposed in a central portion of the second side surface 1120 of the lens barrel 1200. The second driving unit 1200 may be disposed on a virtual line connecting the optical axis A and the central portion of the second side surface 1120 of the lens barrel 1100. The center of the second driving unit 1300 may be disposed on the sixth straight line I6. The second driving unit 1300 may be overlapped with the first driving unit 1200 in a first direction.

The first pin 1610 may be disposed in the lens barrel 1100. The first pin 1610 may be disposed on the third side surface 1130 of the lens barrel 1100. The third side surface 1130 of the lens barrel 1100 may be disposed in a central portion of the first pin 1610. The first pin 1610 may be disposed on a virtual seventh straight line I7 perpendicular to the optical axis A and the first straight line. At this time, when the optical axis A is the z-axis and the sixth straight line I6 is the y-axis, the seventh straight line I7 may mean the x-axis. The first pin 1610 may be overlapped with the second fin 1620 with the optical axis A in a second direction perpendicular to the first direction. At this time, when the optical axis A is the z-axis and the first direction is the y-axis direction, the seventh straight line I7 may mean the x-axis direction.

The second pin 1610 may be disposed in the lens barrel 1100. As for the second pin 1620, the lens barrel 1100 may be disposed on the fourth side surface 1140. The second pin 1620 may be disposed in a central portion of the fourth side surface 1140 of the lens barrel 1100. The second pin 1620 may be disposed on the second straight line. The second fin 1620 may be overlapped with the first fin 1610 in a second direction.

Modified embodiments according to a present embodiment may include some configurations of the first embodiment and some configurations of a second embodiment together. That is, the modified embodiments may include the first embodiment, but some configurations of the first embodiment may be omitted and may include some configurations of the corresponding second embodiment. Or, the modified embodiment may include the second embodiment, but some configurations of a second embodiment are omitted, and may include some configurations of the corresponding first embodiment.

Features, structures, effects, and the like described in the above embodiments are included in at least one embodiment, and are not necessarily limited to only one embodiment. Furthermore, features, structures, effects, etc. illustrated in each embodiment can be combined or modified for other embodiments by those of ordinary skill in the art to which the embodiments belong. Accordingly, the contents related to such combinations and modifications should be interpreted as being included in the scope of the embodiments.

The embodiments of the present invention have been described above with reference to the accompanying drawings, but a person skilled in the art to which the present invention belongs may understand that the present invention can be implemented in other specific forms without changing the technical spirit or essential features. Therefore, it should be understood that the embodiments described above are illustrative and non-limiting in all respects.

The invention claimed is:

1. A camera module, comprising:
a housing comprising an upper plate part and a side plate part being extended from the upper plate part;
a first lens disposed in the upper plate part of the housing;
a first lens barrel disposed below the upper plate part inside the housing;
a second lens barrel disposed below the first lens barrel inside the housing;
a second lens disposed in the first lens barrel;
a third lens disposed in the second lens barrel;
a first piezo motor disposed in the housing and coupled to the first lens barrel, and configured to move the first lens barrel; and
a second piezo motor disposed in the housing and coupled to the second lens barrel, and configured to move the second lens barrel, wherein the first piezo motor comprises a first piezoelectric element and a first pillar that extends from the first piezoelectric element in an optical axis direction, wherein the first piezoelectric element comprises a disc part and a protruded portion that extends downward from the disc part, wherein the upper plate part of the housing comprises a first hole in which the first lens is disposed, a second hole apart from the first hole, and a third hole apart from the first hole and the second hole, and wherein at least a portion of the protruded portion is disposed in the second hole.

2. The camera module according to claim 1, comprising:
a first magnetic scale disposed in the first lens barrel; and
a first sensor disposed in the housing and configured to detect the first magnetic scale.

3. The camera module according to claim 1, wherein each of the first lens, the second lens, and the third lens comprises a plurality of lenses, and wherein the first lens is fixed, and the second lens and the third lens are individually movable.

4. The camera module according to claim 3, wherein the second lens and the third lens move in the optical axis direction, and wherein the distance in which the second lens is movable is greater than the distance in which the third lens is movable.

5. The camera module according to claim 1, wherein the first lens barrel is coupled to the first piezo motor through a first elastic member.

6. The camera module according to claim 5, wherein the first lens barrel comprises a first barrel part accommodating the second lens, and a first guide unit being extended outwardly from the first barrel part and coupled to the first piezo motor.

7. The camera module according to claim 6,
wherein the first elastic member is disposed between the first guide unit of the first lens barrel and the first pillar of the first piezo motor.

8. The camera module according to claim 6, comprising:
a first buffer member and a second buffer member disposed on the first pillar of the first piezo motor, wherein the first buffer member is disposed in the second hole, wherein the second hole comprises a first protrusion disposed at an upper end of the second hole and a second protrusion disposed at a lower end of the second hole, wherein the first protrusion is not overlapped with the second protrusion in the optical axis direction, wherein the first protrusion comprises a plurality of first protrusions that are spaced apart from one another at equal intervals along a circumferential direction of the second hole, and wherein the second protrusion comprises a plurality of second protrusions that are spaced apart from one another at equal intervals along the circumferential direction of the second hole.

9. The camera module according to claim 8, wherein the second buffer member is spaced apart from the first buffer member in the optical axis direction.

10. The camera module according to claim 6, wherein the second piezo motor comprises a second piezoelectric element disposed in the upper plate part of the housing, and a second pillar that extends from the second piezoelectric element in the optical axis direction, and wherein the second pillar of the second piezo motor is disposed opposite to the first pillar of the first piezo motor with respect to the optical axis direction.

11. The camera module according to claim 10, wherein the second lens barrel comprises a second barrel part accommodating the third lens, and a second guide unit being extended outwardly from the second barrel part and coupled to the second piezo motor.

12. The camera module according to claim 11, comprising:
a second elastic member disposed between the second guide unit of the second lens barrel and the second pillar of the second piezo motor.

13. The camera module according to claim 10, comprising:
a third buffer member and a fourth buffer member disposed on the second pillar of the second piezo motor.

14. The camera module according to claim 13, wherein the fourth buffer member is spaced apart from the third buffer member in the optical axis direction.

15. The camera module according to claim 10, wherein a first pin is disposed parallel to the first pillar inside the housing, and wherein the first lens barrel moves along the first pin.

16. The camera module according to claim 15, wherein a second pin is disposed in the housing parallel to the second pillar, and wherein the first pin is disposed closer to the first piezo motor than the second pin, and the second pin is disposed closer to the second piezo motor than the first pin.

17. The camera module according to claim 6, comprising:
a substrate disposed in the side plate part of the housing, wherein the substrate comprises a first portion disposed above the first piezoelectric element of the first piezo motor and a second portion disposed below the first piezoelectric element of the first piezo motor, and wherein the first portion of the substrate is not overlapped with the second portion of the substrate in the optical axis direction.

18. The camera module according to claim 6, wherein the second lens barrel comprises a second barrel part accommodating the third lens, and a second guide unit being extended outwardly from the second barrel part and coupled to the second piezo motor, and wherein at least a portion of the first guide unit is overlapped with the second guide unit in a direction perpendicular to the optical axis direction in an initial state to which no current is applied.

19. The camera module according to claim 1, wherein the second lens performs a zooming function and the third lens performs an auto focus function.

20. A camera module, comprising:
a housing comprising an upper plate part and a side plate part being extended from the upper plate part;
a first lens disposed in the upper plate part of the housing;
a first lens barrel disposed below the upper plate part inside the housing;
a second lens barrel disposed below the first lens barrel inside the housing;
a second lens disposed in the first lens barrel;
a third lens disposed in the second lens barrel;
a first piezo motor disposed in the housing and coupled to the first lens barrel, and configured to move the first lens barrel; and
a second piezo motor disposed in the housing and coupled to the second lens barrel, and configured to move the second lens barrel, wherein a first piezoelectric element comprises a disc part and a protruded portion that extends downward from the disc part, wherein the upper plate part of the housing comprises a first hole in which the first lens is disposed, a second hole apart from the first hole, and a third hole apart from the first hole and the second hole, wherein at least a portion of the protruded portion is disposed in the second hole, wherein the second hole comprises a first protrusion disposed at an upper end of the second hole and a second protrusion disposed at a lower end of the second hole, wherein the first protrusion is not overlapped with the second protrusion in an optical axis direction, wherein the first protrusion comprises a plurality of first protrusions that are spaced apart from one another at equal intervals along a circumferential direction of the second hole, and wherein the second protrusion comprises a plurality of second protrusions that are spaced apart from one another at equal intervals along the circumferential direction of the second hole.

* * * * *